United States Patent
Zhou

(10) Patent No.: US 11,963,109 B2
(45) Date of Patent: *Apr. 16, 2024

(54) METHOD, APPARATUS, DEVICE AND SYSTEM FOR POWER CONFIGURATION DURING MULTI-BANDWIDTH TRANSMISSION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 394 days.

This patent is subject to a terminal disclaimer.

(21) Appl. No.: 17/431,069

(22) PCT Filed: Feb. 15, 2019

(86) PCT No.: PCT/CN2019/075286
§ 371 (c)(1),
(2) Date: Aug. 13, 2021

(87) PCT Pub. No.: WO2020/164145
PCT Pub. Date: Aug. 20, 2020

(65) Prior Publication Data
US 2022/0078725 A1 Mar. 10, 2022

(51) Int. Cl.
*H04W 52/36* (2009.01)
*H04W 52/14* (2009.01)
*H04W 52/34* (2009.01)

(52) U.S. Cl.
CPC ....... *H04W 52/367* (2013.01); *H04W 52/146* (2013.01); *H04W 52/34* (2013.01)

(58) Field of Classification Search
CPC . H04W 52/367; H04W 52/146; H04W 52/34; H04W 52/267; H04W 52/42;
(Continued)

(56) References Cited

U.S. PATENT DOCUMENTS 10,924,982 B2 * 2/2021 Kim .................. H04W 72/04
2006/0128412 A1 * 6/2006 Mantha ............... H04W 52/146
455/69

(Continued)

OTHER PUBLICATIONS

Indian Patent Application No. 202147040387, Office Action dated Sep. 8, 2022, 7 pages.
(Continued)

*Primary Examiner* — Lana N Le
(74) *Attorney, Agent, or Firm* — COZEN O'CONNOR

(57) ABSTRACT

The present disclosure provides a method, apparatus, device and system for power configuration during multi-bandwidth transmission. The base station determines a configuration upper limit of an overall equivalent duty cycle when a terminal performs multi-bandwidth transmission on n bandwidths. The base station generates, for the terminal, configuration information of a first bandwidth among the n bandwidths, wherein the overall equivalent duty cycle on the n bandwidths corresponding to the configuration information is not greater than the configuration upper limit. The base station sends the configuration information to the terminal.

18 Claims, 11 Drawing Sheets

(58) Field of Classification Search
CPC . H04W 72/1268; H04W 72/51; H04W 88/08; H04W 72/0473; H04W 72/042; H04W 72/0453; H04W 88/10; H04W 28/20; H04W 52/14; H04W 72/04; H04W 52/26
See application file for complete search history.

(56) References Cited

U.S. PATENT DOCUMENTS

| | | | |
|---|---|---|---|
| 2014/0105135 A1* | 4/2014 | Tellado | H04W 52/46 |
| | | | 370/329 |
| 2018/0124687 A1* | 5/2018 | Park | H04W 52/42 |
| 2019/0281598 A1* | 9/2019 | Almalfouh | H04W 72/0453 |
| 2020/0314764 A1* | 10/2020 | Noh | H04W 52/146 |
| 2022/0124627 A1* | 4/2022 | Oguma | H04W 52/267 |
| 2022/0124632 A1* | 4/2022 | Zhou | H04W 52/367 |
| 2022/0311487 A1* | 9/2022 | Abedini | H04W 72/0473 |

OTHER PUBLICATIONS

European Patent Application No. 19915143.2, Search and Opinion dated Sep. 6, 2022, 10 pages.
China Unicom "Discussion on Power Class 2 UE for EN-DC(1 LTE FDD band +1 NR band)" 3GPP TSG-RAN WG4 Meeting #88bis, R4-1812504, Oct. 2018, 2 pages.
Mediatek, Inc. "Temporary capability restriction for UE overheating", 3GPP TSG-RAN WG2 Meeting #103bis, R2-1813672, Oct. 2018, 5 pages.

* cited by examiner

METHOD, APPARATUS, DEVICE AND SYSTEM FOR POWER CONFIGURATION DURING MULTI-BANDWIDTH TRANSMISSION

CROSS-REFERENCE TO RELATED APPLICATION

This application is the US national phase application of International Application No. PCT/CN2019/075286, filed on Feb. 15, 2019, the entire contents of which are incorporated herein by reference.

TECHNICAL FIELD

The present disclosure relates to a field of communications, and particularly to a method, an apparatus, a device and a system for power configuration during multi-bandwidth transmission.

BACKGROUND

When a new radio (NR) and a long-term evolution (LTE) technologies are deployed in a coordinated manner, the size of an uplink transmit power of a terminal is graded by a power class. For example, the transmission power of a power class 3 is 23 dBm. At a relatively high frequency level such as 3.5 GHz, in order to ensure an increase of an uplink coverage, it is necessary to introduce a higher transmission power. For example, the transmission power of a power class 2 is 26 dBm. The terminal of a power class greater than the power class 3 is called a high power UE (HPUE).

A specific absorption rate (SAR) is an indicator in a terminal design that measures a radiation amount to which human body is exposed when the terminal transmits a wireless signal. SAR and Over-the-Air Technology (OTA) are indicators corresponding to the transmission capability. They are a pair of contradictory indicators because the transmission capability of the UE needs to exceed the transmission capability of the OTA indicators, but cannot exceed the radiation requirements of the SAR.

When the UE adopts more than two bandwidths for uplink transmission, for example, in a carrier aggregation scenario, the situation becomes more complicated. For example, for a bandwidth aggregation networking of time division duplexing (TDD) or frequency division duplexing (FDD) of LTEs and NRs of different duty cycles, duty cycles of different bandwidths may vary, and the superposition of uplink transmissions over multiple bandwidths may lead to the SAR value exceeding the standard within certain time windows.

SUMMARY

According to an aspect of embodiments of the present disclosure, a method for power configuration during multi-bandwidth transmission is provided. The method includes: determining by a base station, a configuration upper limit of an overall equivalent duty cycle when a terminal performs multi-bandwidth transmission on n bandwidths, where n is an integer greater than 1; generating by the base station, configuration information of a first bandwidth among the n bandwidths for the terminal, wherein the overall equivalent duty cycle on the n bandwidths corresponding to the configuration information is not greater than the configuration upper limit; sending the configuration information to the terminal by the base station, wherein the configuration information is configured to configure power configuration parameters of the terminal for uplink transmission over the first bandwidth.

According to another aspect of embodiments of the present disclosure, a method for power configuration during multi-bandwidth transmission is provided. The method includes: determining by a base station, a configuration upper limit of a duty cycle of each bandwidth when a terminal performs multi-bandwidth transmission on n bandwidths, where n is an integer greater than 1; generating by the base station, configuration information of a first bandwidth among the n bandwidths for the terminal, wherein an equivalent duty cycle on the first bandwidth corresponding to the configuration information is not greater than a configuration upper limit corresponding to the first bandwidth; sending the configuration information to the terminal by the base station, wherein the configuration information is configured to configure power configuration parameters of the terminal for uplink transmission over the first bandwidth.

According to another aspect of the embodiments of the present disclosure, a method for power configuration during multi-bandwidth transmission is provided. The method includes: receiving by a terminal, configuration information sent by a base station; determining by a base station, a configuration upper limit of a duty cycle of each bandwidth when a terminal performs multi-bandwidth transmission on n bandwidths, where n is an integer greater than 1.

According to another aspect of the embodiments of the present disclosure, a method for power configuration during multi-bandwidth transmission is provided. The method includes: receiving by a terminal, configuration information sent by a base station; determining power configuration parameters for uplink transmission over a first bandwidth by the terminal according to the configuration information, in which on n bandwidths in a multi-bandwidth transmission scenario, an equivalent duty cycle on the first bandwidth of the terminal configured by the configuration information is not greater than a configuration upper limit corresponding to the first bandwidth.

According to another aspect of embodiments of the present disclosure, a base station is provided. The base station includes: a processor; a transceiver connected to the processor; in which, the processor is configured to load and execute the instructions executable to implement the method for power configuration during multi-bandwidth transmission executed by a server as described in the above aspect.

According to another aspect of embodiments of the present disclosure, a terminal is provided. The terminal includes: a processor; a transceiver connected to the processor; in which, the processor is configured to load and execute the instructions executable to implement the method for power configuration during multi-bandwidth transmission executed by a terminal as described in the above aspect.

According to another aspect of the present disclosure, a computer readable storage medium is provided, in which, the computer readable storage medium stores at least one instruction, at least one program, a code set or an instruction set, the at least one instruction, and the at least one program, the code set or the instruction set are configured to be loaded and executed by the processor to implement the method for power configuration during multi bandwidth transmission executed by a terminal as described in the above aspect.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodi

DETAILED DESCRIPTION

Figure 1:
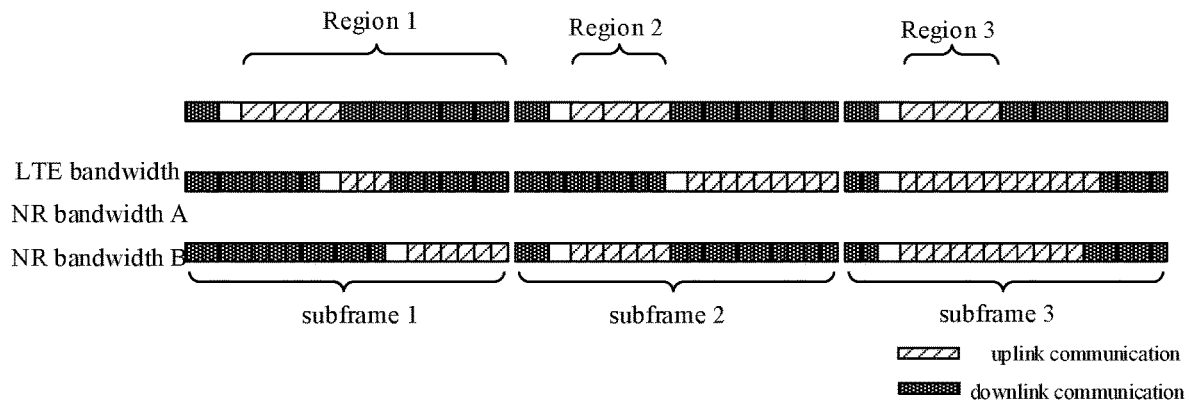
- FIG. 1 is a diagram illustrating a multi-bandwidth transmission scenario provided in the related art.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Several related terms in embodiments of the present disclosure are described as follow:

Multi-bandwidth transmission: a transmission mode where the terminal uses more than two bandwidths for uplink transmission to the base station at the same time. Multi-bandwidth transmission generally includes but is not limited to a carrier aggregation scenario, and a scenario in which a plurality of uplink bandwidth parts (BWPs) and/or sub-bands are configured for the terminal in an NR system.

In embodiments of the present disclosure, multi-bandwidth transmission in a carrier aggregation scenario is taken as an example for illustration.

Carrier aggregation: may refer to continuous carrier aggregation and also may refer to non-continuous carrier aggregation. In embodiments of the present disclosure, carrier aggregation means that the terminal uses carriers in more than two different frequency bands to transmit signals to the base station.

Duty cycle: a ratio of uplink transmission time to total time (uplink transmission time+downlink receiving time) in a subframe.

When NR and LTE are deployed in a coordinated manner, the size of an uplink transmit power of a terminal is graded by a power class. For example, the transmission power of a power class 3 is 23 dBm. At a relatively high frequency level such as 3.5 GHz, in order to ensure an increase of uplink coverage, it is necessary to introduce a higher transmission power, for example, the transmission power of a power class 2 is 26 dBm. The terminal at a power class greater than the power class 3 is called an HPUE.

In a TDD system, a ratio of uplink to downlink may be adjusted, for example, there are seven different ratios of uplink to downlink in the LTE TDD; in an NR system, a ratio of uplink to downlink may be adapted with a symbol unit. Different ratios of uplink to downlink correspond to different duty cycles, and different duty cycles correspond to different SARs. The duty cycle is a ratio of the uplink transmission time to a length of time of the entire subframe when different ratios of uplink to downlink are adopted in a subframe. For example, 15 symbols are included in one subframe, in which 8 symbols are configured for uplink transmission, then the corresponding duty cycle is 8/15.

SAR is an indicator in a terminal design that measures the radiation amount to human body when the terminal transmits wireless signals. SAR and OTA indicators corresponding to the transmission capability are a pair of contradictory indicators, and the transmission capability of the UE needs to exceed the transmission capability of the OTA indicators, but cannot exceed the radiation requirements of the SAR.

The problem of the SAR exceeding the standard may occur for HPUE, that is, when the duty cycle is relatively high, accumulative radiation during a period of time may exceed radiation requirements of the SAR. In the carrier aggregation scenario, for bandwidth aggregation networking of TDD or FDD of LTEs and NRs with different duty cycles, duty cycles of different bandwidths may vary, which may lead to the SAR value exceeding the standard within certain time windows, and the situation of which becomes more complicated. Or, in the non-carrier aggregation scenario, multiple bandwidths allocated to the terminal for use are all in an uplink transmission state, which may also lead to the SAR value exceeding the standard within certain time windows.

As illustrated in FIG. 1, an LTE bandwidth, an NR bandwidth A, and an NR bandwidth B have their respective uplink and downlink configurations. In one case, when the duty cycle, the power and other factors are not considered, the terminal performs uplink transmission on all three bandwidths during the time period of region 3, which may easily lead to the SAR exceeding the standard. In another case, assuming that the NR bandwidth B performs uplink transmission at a high power class, the transmission power on the NR bandwidth B is superposed with the transmission power on the LTE bandwidth during the time period of region 2, which also easily leads to the SAR exceeding the standard. In another case, in a larger time window, for example, taking a frame as a unit of a time window, due to excessive uplink configuration in subframe 3, as illustrated in FIG. 1, it also easily leads to the SAR exceeding the standard.

The disclosure provides a method for power configuration during multi-bandwidth transmission. In a scenario of performing multi-bandwidth transmission on n bandwidths, duty cycles in multiple bandwidths are coordinated, so that an uplink transmit power of the terminal is controlled, thereby avoiding the SAR from exceeding the standard.

In embodiments of the present disclosure, an equivalent duty cycle of a single bandwidth and an overall equivalent duty cycle are provided. The related introduction is as follows.

Equivalent duty cycle of a single bandwidth: refers to a numeric value configured to equivalently measure a duty cycle when the terminal performs uplink transmission on a single bandwidth. The numeric value may be taken as a criterion for evaluating whether the SAR on a single bandwidth exceeds the standard.

A calculation method of an equivalent duty cycle of a single bandwidth: taking a single bandwidth being a jth bandwidth as an example, the entire evaluation time window includes n time child windows, and the terminal adopts n duty cycles and n power classes in the n time child windows on the jth bandwidth. One power class (PC) corresponds to one uplink transmit power. For example, the power of PC2 is 26 dBm, and the power of PC3 is 23 dBm.

For the jth bandwidth among the n bandwidths, the equivalent duty cycle corresponding to the jth bandwidth is equal to:

$$DC_{eq\_Band\_j} = (DC_{p1} \times P_1 \times T_1 + DC_{p2} \times P_2 \times T_2 + DC_{p3} \times P_3 \times T_3 + \ldots + DC_{pi} \times P_i \times T_i + \ldots + DC_{pn} \times P_n \times T_n)/(P_{as\_j} \times T_{window}) \quad (1)$$

where, $DC_{eq\_Band\_j}$ is an equivalent duty cycle of the jth bandwidth at a specified power class; $P_{as\_j}$ is a transmission power of the specified power class corresponding to the jth bandwidth; $T_{window}$ is the entire evaluation time window; $DC_{pi}$ is a duty cycle during an ith sub evaluation time period; $P_i$ is a power corresponding to the actual power class during the ith sub evaluation time period; $T_i$ is the ith sub evaluation time period; respective sub evaluation time periods are non-overlapped, and i is an integer not greater than n. The actual power class during each sub evaluation time period may be the same, and also may be different.

Optionally, the specified power class corresponding to the single bandwidth is configured by the base station or determined in a predefined way. The specified power class corresponding to each bandwidth may be the same, and may also be different. For example, for the jth bandwidth, any of the actual power classes used by the terminal in the jth bandwidth may be configured as the specified power class; or, the minimum class in the actual power classes used by the terminal in the jth bandwidth is configured as the specified power class; or, the maximum class in the actual power classes used by the terminal in the jth bandwidth is configured as the specified power class; or, the predefined power class is determined as the specified power class.

Overall equivalent duty cycle: a numeric value configured to equivalently measure a duty cycle when the entire terminal performs multi-bandwidth transmission on n bandwidths. Optionally, the overall equivalent duty cycle is calculated based on the equivalent duty cycle of the terminal corresponding to each of the n bandwidths. In the multi-bandwidth transmission scenario, the value may be taken as a criterion for evaluating whether the SAR of the entire terminal exceeds the standard.

A first calculation method of the overall equivalent duty cycle: for each of the n bandwidths, the equivalent duty cycle, the specified power class and the evaluation time window corresponding to the bandwidth are multiplied to obtain a first product corresponding to the bandwidth; and then the first products corresponding to the n bandwidths are added to obtain the overall equivalent duty cycle. That is:

$$DC_{eq} = (DC_{eq\_Band\_1} \times P_{as\_1} \times T_{window} + DC_{peq\_Band\_2} \times P_{as\_2} \times T_{window} + DC_{peq\_Band\_3} \times P_{as\_3} \times T_{window} + \ldots + DC_{eq\_Band\_j} \times P_{as\_j} \times T_{window} + \ldots + DC_{eq\_Band\_n} \times P_{as\_n} \times T_{window})/(P_{as} \times T_{window}) \quad (2)$$

where, $DC_{eq}$ is the overall equivalent duty cycle of the terminal, $P_{as}$ is the specified power class corresponding to the entire terminal, $DC_{eq\_Band\_j}$ is the equivalent duty cycle of the jth bandwidth at the specified power class; $P_{as\_j}$ is a transmission power of the specified power class corresponding to the jth bandwidth; $T_{window}$ is the entire evaluation time window, and $DC_{eq\_Band\_j} \times P_{as\_j} \times T_{window}$ represents the first product.

A second calculation method of the overall equivalent duty cycle: for each of the n bandwidths, the equivalent duty cycle and the specified power class corresponding to the bandwidth are multiplied to obtain a second product corresponding to the bandwidth; and then the second products corresponding to the n bandwidths are added to obtain the overall equivalent duty cycle. That is:

$$DC_{eq} = (DC_{eq\_Band\_1} \times P_{as\_1} + DC_{peq\_Band\_2} \times P_{as\_2} + DC_{peq\_Band\_3} \times P_{as\_3} + \ldots + DC_{eq\_Band\_j} \times P_{as\_j} + \ldots + DC_{eq\_Band\_n} \times P_{as\_n})/(P_{as}) \quad (3)$$

where, $DC_{eq}$ is the overall equivalent duty cycle of the terminal, $P_{as}$ is the specified power class corresponding to the entire terminal, $DC_{eq\_Band\_j}$ is the equivalent duty cycle of the jth bandwidth at the specified power class; $P_{as\_j}$ is the transmission power of the specified power class corresponding to the jth bandwidth; $DC_{eq\_Band\_j} \times P_{as\_j}$ represents the second product.

Figure 2:
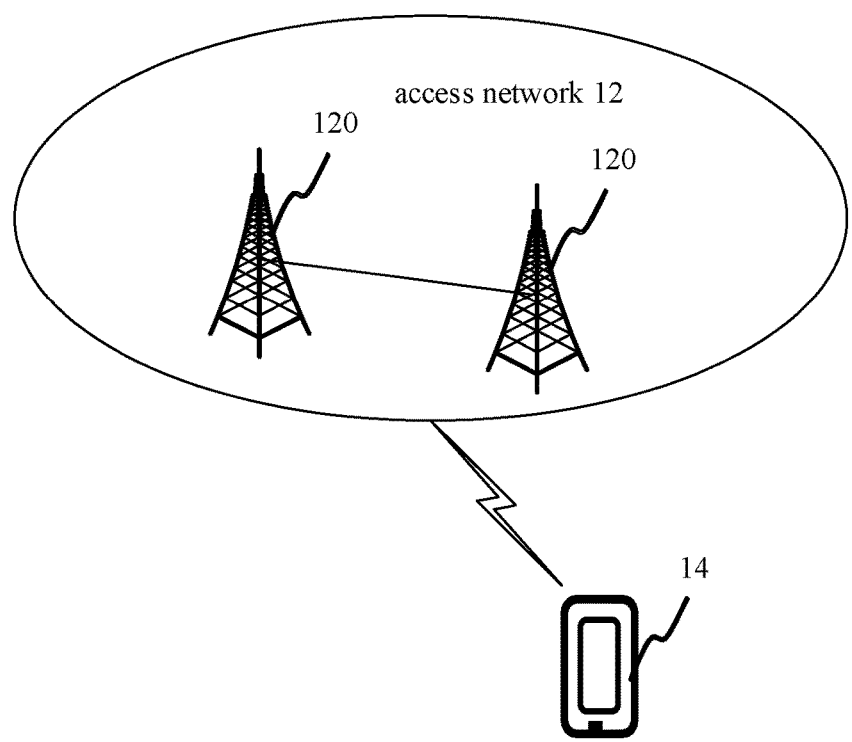
FIG. 2 is a schematic diagram illustrating a communication system according to an example embodiment.

FIG. 2 is a schematic diagram illustrating a communication system according to an example embodiment. The communication system may be a 5G NR system. The communication system may include an access network 12 and a terminal 14.

The access network 12 includes several access network devices 120. The access network device 120 and the core network device 110 communicate with each other through some kind of interface technology, for example, an S1 interface in the LTE system, an NG interface in the 5G NR system. The access network device 120 may be a base station (BS), which is a device deployed in the access network to provide wireless communication function for the terminal. The base station may include various forms of macro base stations, micro base stations, relay stations, access points, etc. In the system adopting different wireless access technologies, the name of the devices with base station function may vary. For example, in LTE system, it is referred to as eNodeB or eNB; in 5G NR system, it is referred to as gNodeB or gNB. With evolution of communications technology, the name of "base station" may vary.

The terminal 14 may include all kinds of handheld devices, vehicle devices, wearable devices and computing devices with wireless communication function, or other processing devices connected to wireless modems, as well as various forms of user equipment (UE), mobile stations (MS), terminal devices, etc. For convenience of description, the devices mentioned above are collectively referred to as the terminal. The access network device 120 and the terminal 14 communicate with each other through some kind of air interface technology, for example, a Uu interface.

Figure 3:
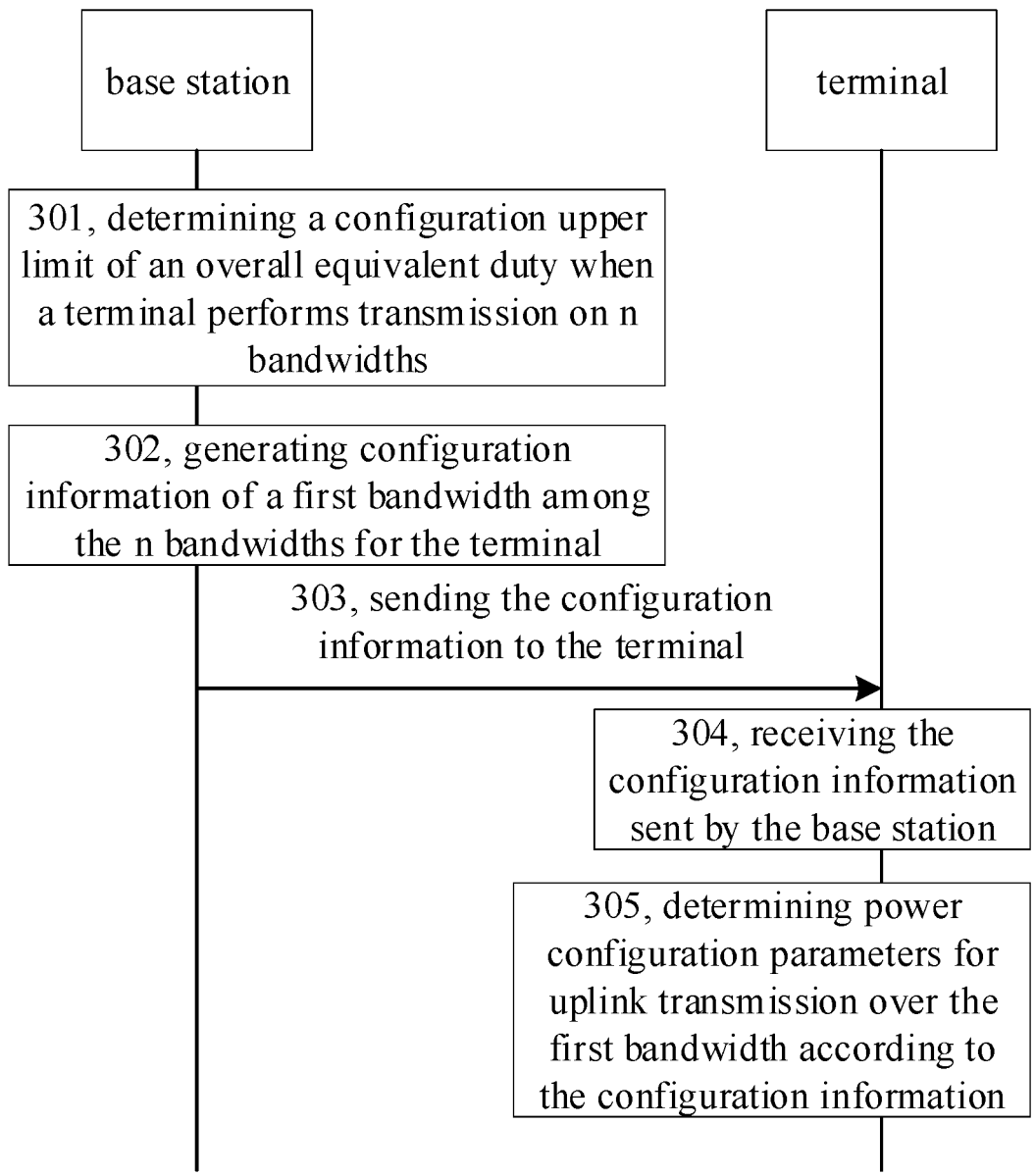
FIG. 3 is a flowchart illustrating a method for power configuration during multi-bandwidth transmission according to an example embodiment.

FIG. 3 is a flowchart illustrating a method for power configuration during multi-bandwidth transmission according to an example embodiment. The method may be executed by the communication system as illustrated in FIG. 2. The method includes followings.

At step 301, a base station determines a configuration upper limit of an overall equivalent duty cycle when a terminal performs multi-bandwidth transmission on n bandwidths.

The terminal performs multi-bandwidth transmission on n bandwidths, where n is an integer greater than 1.

Optionally, multi-bandwidth transmission on n bandwidths includes multi-bandwidth transmission under carrier aggregation, and/or multi-bandwidth transmission under non-carrier aggregation. Multi-bandwidth transmission may be referred to as multi-bandwidth simultaneous transmission, multi-bandwidth coordinated transmission, multi-bandwidth cooperative transmission and the like, which is not limited here.

The overall equivalent duty cycle refers to n equivalent duty cycles corresponding to the uplink transmission performed by the terminal on n bandwidths at a specified power class that are integrated into one duty cycle. Optionally, the overall equivalent duty cycle is calculated according to the equivalent duty cycle of the terminal corresponding to each of the n bandwidths. The configuration upper limit of the overall equivalent duty cycle is a criterion for judging whether the SAR exceeds the standard.

The configuration upper limit of the overall equivalent duty cycle may be configured by the base station, and may also be reported to the base station by the terminal.

At step 302, the base station generates for the terminal, configuration information of a first bandwidth among the n bandwidths.

The first bandwidth is a bandwidth to be configured at this time among the n bandwidths, and the first bandwidth includes all or a part of the n bandwidths, which is not limited here.

The base station generates configuration information of the first bandwidth for the terminal, in which the configuration information is configured to configure power configuration parameters of the terminal for uplink transmission over the first bandwidth, the power configuration parameters including a power class and/or a duty cycle.

The base station generates for the terminal, configuration information of the first bandwidth among the n bandwidths, in which the overall equivalent duty cycle on the n bandwidths corresponding to the configuration information is not greater than the above configuration upper limit. That is, for the terminal configured by the configuration information, the overall equivalent duty cycle during uplink transmission on n bandwidths is not greater than the above configuration upper limit.

At step 303, the base station sends the configuration information to the terminal.

The base station sends the generated configuration information of the first bandwidth to the terminal, in which the configuration information is configured to configure a power configuration parameter of the terminal for uplink transmission over the first bandwidth.

Optionally, the configuration information includes configuration information of one or more first bandwidths, and is configured to configure the power configuration parameter of the terminal for uplink transmission over one or more first bandwidths.

At step 304, the terminal receives the configuration information sent by the base station.

At step 305, the terminal determines the power configuration parameter for uplink transmission over the first bandwidth according to configuration information.

The power configuration parameter includes at least one of a duty cycle used by the terminal for uplink transmission over the first bandwidth and a power class used by the terminal for uplink transmission over the first bandwidth.

In summary, according to the method of this embodiment, in a scenario where the terminal adopts multi-bandwidth transmission, equivalent duty cycles of the terminal on the n bandwidths are integrated into an overall equivalent duty cycle of the terminal, and the configuration upper limit of the overall equivalent duty cycle is adopted as a criterion for judging whether the SAR exceeds the standard, so that when the base station generates configuration information of the first bandwidth among the n bandwidths for the terminal, the base station may reasonably configure the configuration information based on the configuration upper limit of the unified overall equivalent duty cycle, which ensures that the overall equivalent duty cycle on the n bandwidths allocated for use by the terminal is not greater than the configuration upper limit, thereby reducing or avoiding the problem of the SAR exceeding the standard within certain time windows.

In optional embodiments based on the embodiment of FIG. 3, the process of generating configuration information of the first bandwidth among the n bandwidths for the terminal by the base station (step 302) includes following steps.

At step 3021, the base station obtains the equivalent duty cycle corresponding to each of the n bandwidths of the terminal.

When there is a need to configure the first bandwidth among the n bandwidths, the base station initially generates a first power class and a first duty cycle of the first bandwidth according to at least one of business, coverage, power consumption and antenna configuration. The first power class refers to an actual transmission power of the terminal for uplink transmission over the first bandwidth.

The calculation method of the equivalent duty cycle corresponding to a single bandwidth is as illustrated in Formula (1).

The equivalent duty cycle corresponding to each of n bandwidths may be calculated by the base station itself, for example, the equivalent duty cycle of the first bandwidth may be calculated by the base station; and also may be reported to the base station after calculation by the terminal, for example, the equivalent duty cycle of the second bandwidth in addition to the first bandwidth may be calculated in advance by the terminal and reported to the base station. This will not be limited in the embodiment.

At step 3022, the overall equivalent duty cycle of the terminal is calculated according to the equivalent duty cycle and the specified power class of the terminal corresponding to each bandwidth.

After obtaining the equivalent duty cycle and the specified power class corresponding to each bandwidth, the base station calculates the overall equivalent duty cycle of the terminal according to Formula (2) and Formula (3).

The specified power class $P_{as}$ corresponding to the entire terminal in Formula (2) or Formula (3) is configured by the base station or determined in a predefined way. For example, any of the actual power classes used by the terminal in the n bandwidths may be configured as the specified power class; or, the minimum class in the actual power classes used by the terminal in the n bandwidths is configured as the specified power class; or, the maximum class in the actual power classes used by the terminal in the n bandwidths is configured as the specified power class; or, the predefined power class is determined as the specified power class.

At step 3023, it is judged whether the overall equivalent duty cycle is greater than a configuration upper limit.

That is, the base station predicts whether the SAR of the terminal configured at this time exceeds the standard.

When the overall equivalent duty cycle is not greater than the configuration upper limit, step 3024 is executed.

When the overall equivalent duty cycle is greater than the configuration upper limit, step 3025 is executed.

At step 3024, when the overall equivalent duty cycle is not greater than the configuration upper limit, configuration information of the first bandwidth is generated.

Optionally, when the overall equivalent duty cycle is not greater than the configuration upper limit, the base station generates configuration information of the first bandwidth according to the first duty cycle and/or the first power class of the first bandwidth. For example, according to any changed one or both of the first duty cycle and the first power class, configuration information of the first bandwidth is generated.

At step 3025, when the overall equivalent duty cycle is greater than the configuration upper limit, configuration information of the first bandwidth is regenerated.

When the overall equivalent duty cycle is greater than the configuration upper limit, the base station reduces the first duty cycle and/or the first power class of the first bandwidth, and recalculates the overall equivalent duty cycle of the terminal, and then execute step 3023 again, until the overall equivalent duty cycle of the terminal is not greater than the configuration upper limit. Then, configuration information of the first bandwidth is generated according to the first duty cycle and/or the first power class of the first bandwidth.

Figure 4:
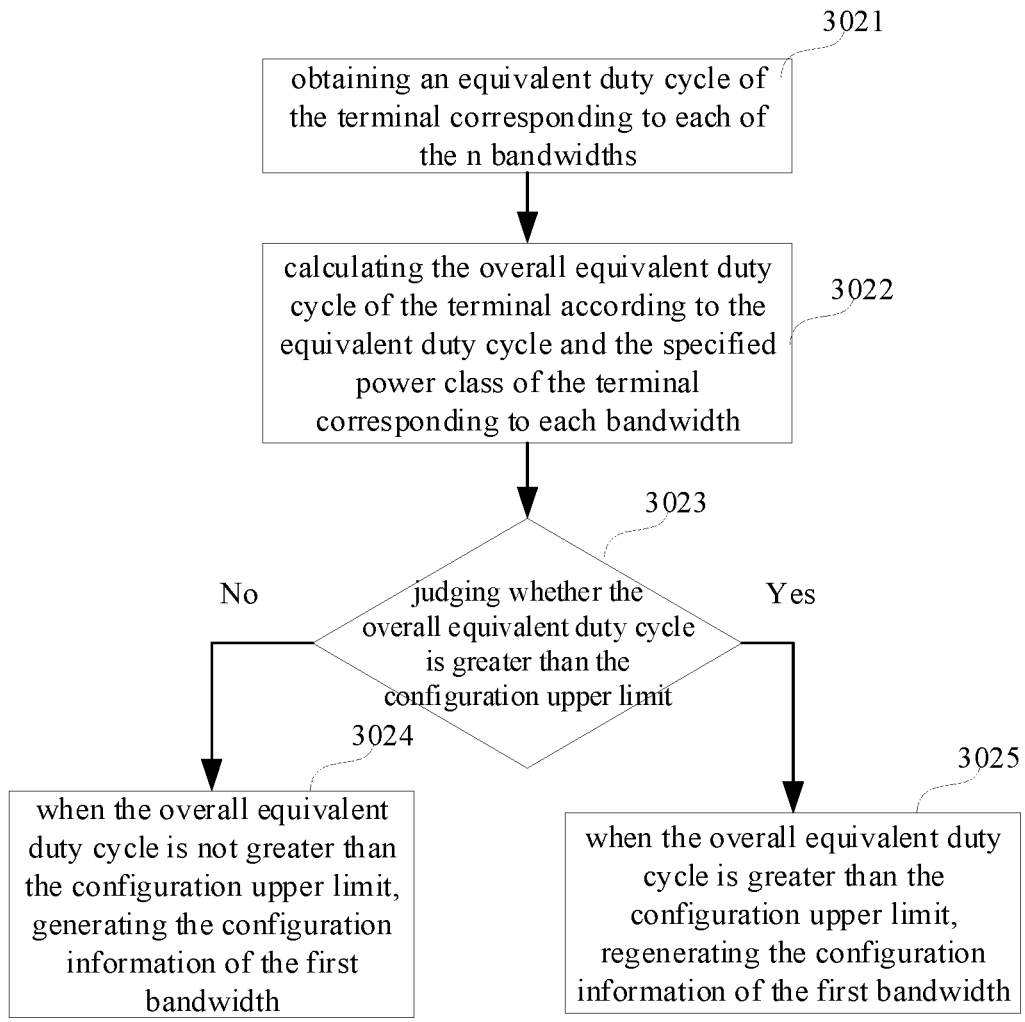
FIG. 4 is a flowchart illustrating a method for power configuration during multi-bandwidth transmission according to another example embodiment.

It should be noted that, in embodiments as illustrated in FIG. 4, obtaining the equivalent duty cycle of the terminal corresponding to each of the n bandwidths by the base station includes the two following cases:

First case, when the terminal is just connected to a network, how the base station obtains the equivalent duty cycle of the terminal corresponding to each of the n bandwidths.

Second case, when the terminal has been connected to a network, how the base station obtains the equivalent duty cycle of the terminal corresponding to each of the n bandwidths in case that the base station needs to adjust one or more bandwidths among the n bandwidths.

In the first case, since the bandwidth allocated to the terminal when just connected to the network corresponds to a default duty cycle and a preset power class, the base station calculates the equivalent duty cycle corresponding to each bandwidth according to the default duty cycle and the preset power class corresponding to each of the n bandwidths.

In the second case, when the terminal performs uplink transmission over multiple bandwidths after having been connected to the network, due to change of at least one of business, coverage, power consumption and antenna configuration, power configuration parameters of the first bandwidth among the n bandwidths need to be adjusted.

When the first bandwidth includes all of the n bandwidths, the base station adjusts the first duty cycle and/or the first power class of the first bandwidth according to the adjustment requirement, and recalculates the equivalent duty cycle corresponding to the first bandwidth according to the adjusted first duty cycle and/or the adjusted first power class of the first bandwidth.

When the first bandwidth includes a part of n bandwidths, the base station further needs to obtain an equivalent duty cycle corresponding to the second bandwidth in addition to the first bandwidth among the n bandwidths.

In a possible implementation, the base station obtains a second duty cycle and a second power class of the second bandwidth in addition to the first bandwidth among the n bandwidths, and calculates the equivalent duty cycle corresponding to the second bandwidth according to the second bandwidth and the second power class. For example, the base station reads historically cached second duty cycle and second power class of the second bandwidth, or, the base station receives the second duty cycle and the second power class of the second bandwidth reported by the terminal. The second power class refers to an actual transmission power of the terminal for uplink transmission over the second bandwidth.

In another possible implementation, the base station obtains the equivalent duty cycle corresponding to the second bandwidth in addition to the first bandwidth among n bandwidths. For example, the base station reads a historically cached equivalent duty cycle of the second bandwidth, or, the base station receives the equivalent duty cycle of the second bandwidth reported by the terminal.

After obtaining the equivalent duty cycle corresponding to the first bandwidth and the equivalent duty cycle corresponding to the second bandwidth, the base station calculates the overall equivalent duty cycle according to Formula 2 and Formula 3 to further determine whether the overall equivalent duty cycle is greater than the configuration upper limit.

It is to be noted that, in embodiments as illustrated in FIG. 4, when the overall equivalent duty cycle is greater than the configuration upper limit, in addition to regenerating configuration information of the first bandwidth, the base station may further reduce the second duty cycle and/or the second power class of the second bandwidth. For example, the terminal performs uplink transmission on bandwidth A, bandwidth B and bandwidth C at the same time. When it is necessary to increase power configuration parameters corresponding to the bandwidth A due to business requirements, and when the adjusted overall equivalent duty cycle is greater than the configuration upper limit, the base station may reduce power configuration parameters corresponding to the bandwidth B and/or the bandwidth C.

The base station calculates the equivalent duty cycle corresponding to the second bandwidth according to the reduced second duty cycle and second power class of the second bandwidth, and calculates the overall equivalent duty cycle according to the equivalent duty cycle corresponding to the first bandwidth and the equivalent duty cycle corresponding to the second bandwidth.

It is to be noted that, since the power configuration parameters of the second bandwidth after the lower processing have changed, the second bandwidth after the lower processing becomes the first bandwidth configured at this time.

It is to be noted that, the second bandwidth may be reduced multiple times until the overall equivalent duty cycle of the terminal is not greater than the configuration upper limit.

Figure 5:
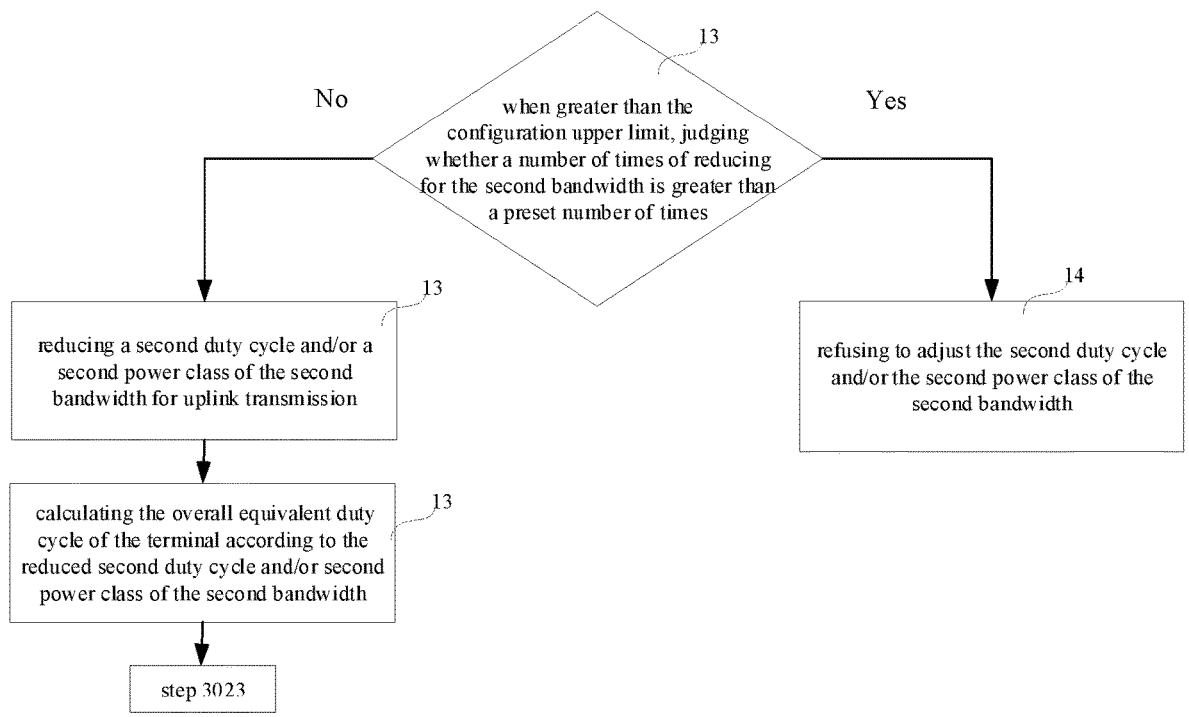
FIG. 5 is a flowchart illustrating a method for power configuration during multi-bandwidth transmission according to another example embodiment.

In optional embodiments based on FIG. 4, since the second bandwidth may not be reduced infinite times, the base station further stores a preset number of times, which configured to avoid multiple invalid reductions for the second bandwidth. As illustrated in FIG. 5, the base station continues or rejects the adjustment of the second bandwidth according to the preset number of times, steps of which are as follows.

At step 11, it is judged whether the number of times of reduction is greater than the preset number of times.

The base station stores the preset number of times, in which the preset number of times is configured to indicate an upper limit of number of times of the base station adjusting the second duty cycle and/or the second power class of the second bandwidth.

When there is a need to reduce power configuration parameters of the second bandwidth, the base station judges whether the number of times of reduction for the second bandwidth is greater than the preset number of times.

When the number of times of reduction is greater than the preset number of times, step 12 is executed; or else, step 14 is executed.

At step 12, the second duty cycle and/or the second power class of the second bandwidth are reduced.

In some embodiments, the base station reduces the second duty cycle for uplink transmission of the terminal over the second bandwidth.

In some embodiments, the base station reduces the second power class for uplink transmission of the terminal over the second bandwidth.

In some embodiments, the base station reduces both the second duty cycle and the second power class for uplink transmission of the terminal over the second bandwidth.

At step 13, the overall equivalent duty cycle of the terminal is calculated according to the reduced second duty cycle and/or reduced second power class of the second bandwidth.

After the base station recalculates the overall equivalent duty cycle of the terminal, step 3023 is executed again.

At step 14, the base station rejects the adjustment of the second duty cycle and/or the second power class of the second bandwidth.

Optionally, when the number of times of reduction for the second bandwidth has reached the preset number of times, the base station may cancel configuration at this time.

In summary, according to the method of the embodiment, the second duty cycle and/or the second power class of the second bandwidth may be reduced to ensure that the overall equivalent duty cycle of the terminal is not greater than the configuration upper limit while ensuring a normal configuration of the first bandwidth, thereby avoiding the SAR exceeding the standard within certain time windows.

In addition, according to the method of the embodiment, the time required for configuration of the base station is controlled by limiting the upper limit of the number of times of reduction, which ensures that the terminal may obtain configuration information from the base station in time, thereby ensuring a time delay requirement during uplink transmission.

In optional embodiments based on FIG. 4, the business priority of all or a part of the second bandwidths may become higher in the process of generating configuration information of the first bandwidth by the base station, that is, there is the second bandwidth whose business priority is greater than the business priority of the first bandwidth. When there is a need to reduce power configuration parameters of the second bandwidth, it is preferable to reduce the second bandwidth with a relatively low business priority. In some embodiments, for example, the business priorities of all of the second bandwidth are greater than the business priority of the first bandwidth, and the following adjustment method may be adopted.

When the overall equivalent duty cycle of the base station is greater than the configuration upper limit, and there is the second bandwidth whose business priority is greater than the business priority of the first bandwidth, the first equivalent duty cycle and/or the first power class of the first bandwidth is reduced. The base station recalculates the overall equivalent duty cycle according to the reduced first equivalent duty cycle and/or first power class of the first bandwidth. When the overall equivalent duty cycle is not greater than the configuration upper limit, configuration information of the first bandwidth is generated according to the first duty cycle and/or the first power class of the first bandwidth.

Figure 6:
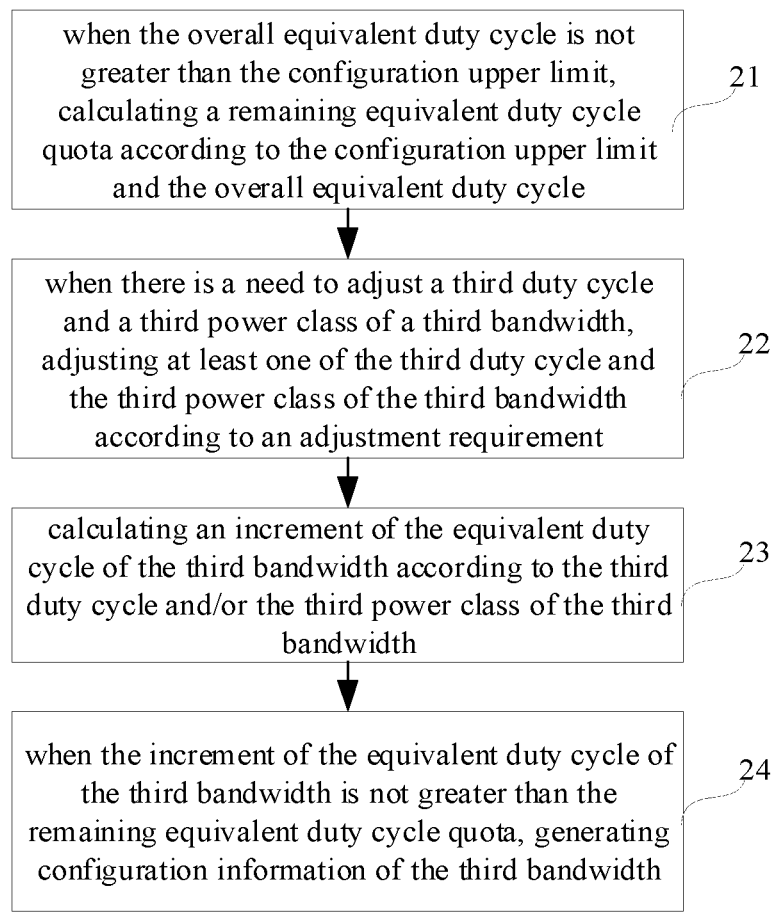
FIG. 6 is a flowchart illustrating a method for power configuration during multi-bandwidth transmission according to another example embodiment.

In the above embodiments, when it is judged whether the SAR of the terminal exceeds the standard, the overall equivalent duty cycle of the terminal is adopted for calculation. In some optional embodiments, after the overall equivalent duty cycle is calculated for the first time, the base station may calculate a remaining equivalent duty cycle quota. When it is necessary to judge whether the SAR of the terminal exceeds the standard subsequently, it is only necessary to calculate whether the duty cycle increment adjusted at this time is greater than the remaining equivalent duty cycle quota. As illustrated in FIG. 6, the process may include the following steps.

At step 21, when the overall equivalent duty cycle is not greater than the configuration upper limit, the remaining equivalent duty cycle quota is calculated according to the configuration upper limit and the overall equivalent duty cycle.

The remaining equivalent duty cycle quota=(configuration upper limit−overall equivalent duty cycle of the terminal). That is, when the overall equivalent duty cycle is not greater than the configuration upper limit, the base station obtains the remaining equivalent duty cycle quota by the subtracting the overall equivalent duty cycle from the configuration upper limit.

At step 22, when it is necessary to adjust a third duty cycle and a third power class of a third bandwidth, at least one of the third duty cycle and the third power class of the third bandwidth is adjusted according to the adjustment requirement.

Optionally, the adjustment requirement includes at least one of business, coverage area, power consumption and antenna configuration. The base station adjusts the third duty cycle and/or the third power class of the third bandwidth according to the at least one of the adjustment requirements. The third power class refers to an actual power class for uplink transmission of the terminal over the third bandwidth.

The third duty cycle and/or the third power class of the third bandwidth may be increased or reduced.

At step 23, an increment of the equivalent duty cycle of the third bandwidth is calculated according to the third duty cycle and/or the third power class of the third bandwidth.

The increment=(the equivalent duty cycle of the third bandwidth after adjustment at this time−the equivalent duty cycle of the third bandwidth before adjustment at this time)

At step 24, when the increment of the equivalent duty cycle of the third bandwidth is not greater than the remaining equivalent duty cycle quota, configuration information of the third bandwidth is generated.

It is to be noted that, the precedence relationship of the computation time of the remaining equivalent duty cycle quota and the computation time of the increment is not limited. The above computations may be performed at the same time, or the remaining equivalent duty cycle quota may be calculated first and then the increment of the equivalent duty cycle of the third bandwidth may be calculated, or the increment of the equivalent duty cycle of the third bandwidth may be calculated first and then the remaining equivalent duty cycle quota may be calculated.

In summary, in the method of the embodiment, the base station judges whether the SAR value of the terminal exceeds the standard through calculating and comparing the increment of the equivalent duty cycle of the third bandwidth with the remaining equivalent duty cycle quota, without need to recalculate the overall equivalent duty cycle, which simplifies computation and reduces a computation amount of the base station.

The obtaining method of "the configuration upper limit of the overall equivalent duty cycle" at the above step 301 of FIG. 3 is introduced as below. In the related art, the HPUE may use the first control signaling to report an upper limit of a duty cycle to the base station, in which, the upper limit of the duty cycle is an upper limit of a duty cycle of the terminal at power class 2 not exceeding the SAR indicator. In the process of determining "the configuration upper limit of the overall equivalent duty cycle" between the base station and the terminal, the first control signaling may be used or extended and used, and also a new second control signaling may be enabled.

The step 301 may be in any one of the following three implementations.

In the first implementation, the base station receives the configuration upper limit of the overall equivalent duty cycle reported by the terminal, in which the configuration upper limit is estimated by the terminal.

In the second implementation, the base station receives the configuration upper limit of the overall equivalent duty cycle reported by the terminal, in which the configuration upper limit is calculated by the terminal according to the configuration upper limit of the equivalent duty cycle of each bandwidth.

In the third implementation, the base station receives a sub configuration upper limit of the equivalent duty cycle of each bandwidth reported by the terminal, and determines the configuration upper limit of the overall equivalent duty cycle according to the above sub configuration upper limits.

It should be noted that, the first implementation may be completed based on an old signaling; the old signaling may be extended, and the second implementation may be completed based on the extended signaling; the third implementation may be completed based on a new signaling.

Optionally, the old signaling includes but not limited to at least one of a physical layer control signaling, an upper layer RRC/MAC CE signaling and a broadcast signaling.

Optionally, the new signaling includes but not limited to at least one of a physical layer control signaling, an upper layer RRC/MAC CE signaling and a broadcast signaling.

In the first implementation, the terminal obtains a sub configuration upper limit of a duty cycle when a fourth bandwidth among the n bandwidths works independently at the corresponding power class, and determines the sub configuration upper limit as the configuration upper limit of the overall equivalent duty cycle.

Since the terminal can obtain the sub configuration upper limit of the duty cycle when the entire UE works independently in the fourth bandwidth (any of n bandwidths) at the specified power class, according to the requirement of SAR corresponding to the region or the operator, the terminal may directly determine the sub configuration upper limit as "the configuration upper limit of the overall equivalent duty cycle" and report it to the base station. Different from the multi-bandwidth transmission scenario, "work independently" refers to a scenario in which uplink transmission is performed using a single bandwidth.

Optionally, when the terminal obtains the configuration upper limits of the duty cycles of multiple bandwidths when working independently at the specified power class, one bandwidth may be randomly selected as a fourth bandwidth; or, a bandwidth with the minimum configuration upper limit among the multiple bandwidths is selected as a fourth bandwidth; or, a bandwidth with the maximum configuration upper limit among the multiple bandwidths is selected as a fourth bandwidth.

Figure 7:
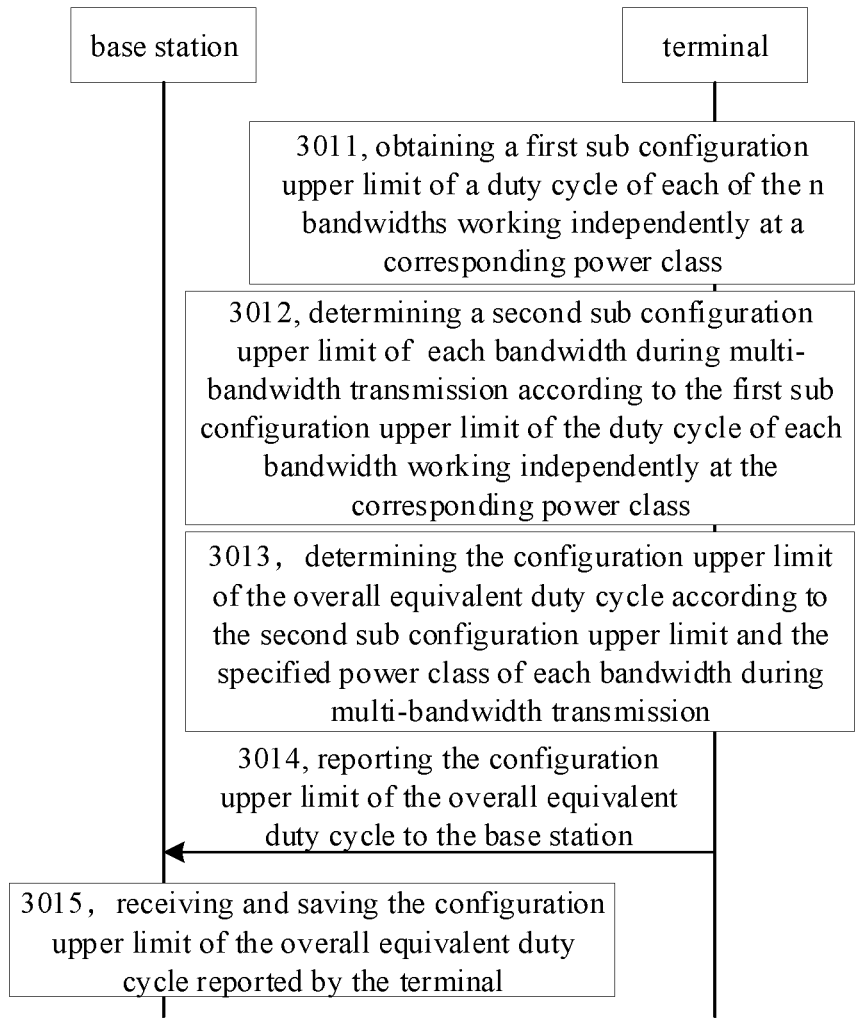
FIG. 7 is a flowchart illustrating a method for power configuration during multi-bandwidth transmission according to another example embodiment.

In the second implementation, as illustrated in FIG. 7, the terminal calculates the configuration upper limit of the overall equivalent duty cycle first, and then reports the configuration upper limit of the overall equivalent duty cycle to the base station. The process may include the following steps.

At step 3011, the terminal obtains a first sub configuration upper limit of a duty cycle of each of the n bandwidths when working independently at the corresponding power class.

At step 3012, the terminal determines a second sub configuration upper limit of each bandwidth during multi-bandwidth transmission according to the first sub configuration upper limit of the duty cycle when each bandwidth works independently at the corresponding power class.

The second sub configuration upper limit is less than the first sub configuration upper limit. That is, the second sub configuration upper limit requires a certain fallback relative to the first sub configuration upper limit.

In an optional embodiment, the terminal calculates an average value of the first sub configuration upper limits of the equivalent duty cycles when the n bandwidths work independently at the corresponding power class, and determines a quotient value of the average value and n as the second sub configuration upper limit of each bandwidth during multi-bandwidth transmission. For example, the first sub configuration upper limit of each of bandwidth A, bandwidth B and bandwidth C is 75%, the quotient value 25% of 75% and 3 is determined as the second sub configuration upper limit of each bandwidth during multi-bandwidth transmission.

In an optional embodiment, the terminal calculates a maximum value of the first sub configuration upper limits of the equivalent duty cycles when the n bandwidths work independently at the corresponding power class, and determines a quotient value of the maximum value and n as the second sub configuration upper limit of each bandwidth during multi-bandwidth transmission.

For example, the first sub configuration upper limit of bandwidth D is 80%, the first sub configuration upper limit of bandwidth E is 90%, and the first sub configuration upper limit of bandwidth F is 60%, among which the first sub configuration upper limit of bandwidth E is maximum, therefore, the quotient value 30% of 90% and 3 is determined as the second sub configuration upper limit of each bandwidth during multi-bandwidth transmission.

In an optional embodiment, the terminal calculates a minimum value of the first sub configuration upper limits of the equivalent duty cycles when the n bandwidths work independently at the corresponding power class, and determines a quotient value of the minimum value and n as the second sub configuration upper limit of each bandwidth during multi-bandwidth transmission.

For example, the first sub configuration upper limit of bandwidth D is 80%, the first sub configuration upper limit of bandwidth E is 90%, and the first sub configuration upper limit of bandwidth F is 60%, among which the first sub configuration upper limit of the bandwidth F is minimum, therefore, the quotient value 20% of 60% and 3 is determined as the second sub configuration upper limit of each bandwidth during multi-bandwidth transmission.

In an optional embodiment, the terminal calculates an average value of the first sub configuration upper limits of the equivalent duty cycles when the n bandwidths work independently at the corresponding power class, and determines n subdivision values after dividing the average value according to n weights as the second sub configuration upper limits of the n bandwidths during multi-bandwidth transmission, in which the n weights correspond to the n bandwidths one by one and the sum of the n weights is 1.

For example, the first sub configuration upper limit of each of bandwidth M and bandwidth N is 80%, and the weight of each of the two bandwidths is 0.5, then 80% is divided according to the weight, and the second sub configuration upper limit of each of the bandwidth M and the bandwidth N during multi-bandwidth transmission is 40%.

The sizes of n weights may be set according to at least one of business priority, power consumption, coverage and antenna configuration on each bandwidth.

In an optional embodiment, the terminal calculates the maximum value of the first sub configuration upper limits of the equivalent duty cycles when the n bandwidths work independently at the corresponding power class, and determines n subdivision values after dividing the maximum value according to n weights as the second sub configuration upper limits of the n bandwidths during multi-bandwidth transmission, in which the n weights correspond to the n bandwidths one by one and the sum of the n weights is 1.

For example, the first sub configuration upper limit of bandwidth Q is 50%, the first sub configuration upper limit of bandwidth U is 70%, and the first sub configuration upper limit of bandwidth V is 90%, the weight of bandwidth Q is 0.3, the weight of bandwidth U is 0.5, and the weight of bandwidth V is 0.2, in which, the first sub configuration upper limit of bandwidth V is maximum. Therefore, the second sub configuration upper limit of bandwidth Q during multi-bandwidth transmission is 27%, the second sub configuration upper limit of bandwidth U during multi-bandwidth transmission is 45%, and the second sub configuration upper limit of bandwidth V during multi-bandwidth transmission is 18%.

In an optional embodiment, the terminal calculates a minimum value of the first sub configuration upper limits of the equivalent duty cycles when the n bandwidths work independently at the corresponding power class, and determines n subdivision values after dividing the minimum value according to n weights as the second sub configuration upper limits of the n bandwidths during multi-bandwidth transmission, in which the n weights correspond to the n bandwidths one by one and the sum of the n weights is 1.

For example, the first sub configuration upper limit of bandwidth Q is 50%, the first sub configuration upper limit of bandwidth U is 70%, and the first sub configuration upper limit of bandwidth V is 90%, the weight of bandwidth Q is 0.3, the weight of bandwidth U is 0.5, and the weight of bandwidth V is 0.2, in which, the first sub configuration upper limit of bandwidth Q is minimum. Therefore, the second sub configuration upper limit of bandwidth Q during multi-bandwidth transmission is 15%, the second sub configuration upper limit of bandwidth U during multi-bandwidth transmission is 25%, and the second sub configuration upper limit of bandwidth V during multi-bandwidth transmission is 10%.

At step 3013, the terminal determines the configuration upper limit of the overall equivalent duty cycle according to the second sub configuration upper limit and the specified power class of each bandwidth during multi-bandwidth transmission.

When the overall equivalent duty cycle is calculated using Formula 2, based on a similar calculation principle, for each of the n bandwidths, the terminal multiplies the second sub configuration upper limit, the power class $P_{as\_j}$ and the evaluation time window of the bandwidth during multi-bandwidth transmission to obtain a third product corresponding to the bandwidth. The third products corresponding to the n bandwidths are added to obtain the configuration upper limit of the overall equivalent duty cycle.

When the overall equivalent duty cycle is calculated using Formula 3, based on a similar calculation principle, for each of the n bandwidths, the second sub configuration upper limit and the power class $P_{as\_j}$ of the bandwidth during multi-bandwidth transmission are multiplied to obtain a fourth product corresponding to the bandwidth. The fourth products corresponding to the n bandwidths are accumulated to obtain the configuration upper limit of the overall equivalent duty cycle.

At step 3014, the terminal reports the configuration upper limit of the overall equivalent duty cycle to the base station.

At step 3015, the base station receives and saves the configuration upper limit of the overall equivalent duty cycle reported by the terminal.

Figure 8:
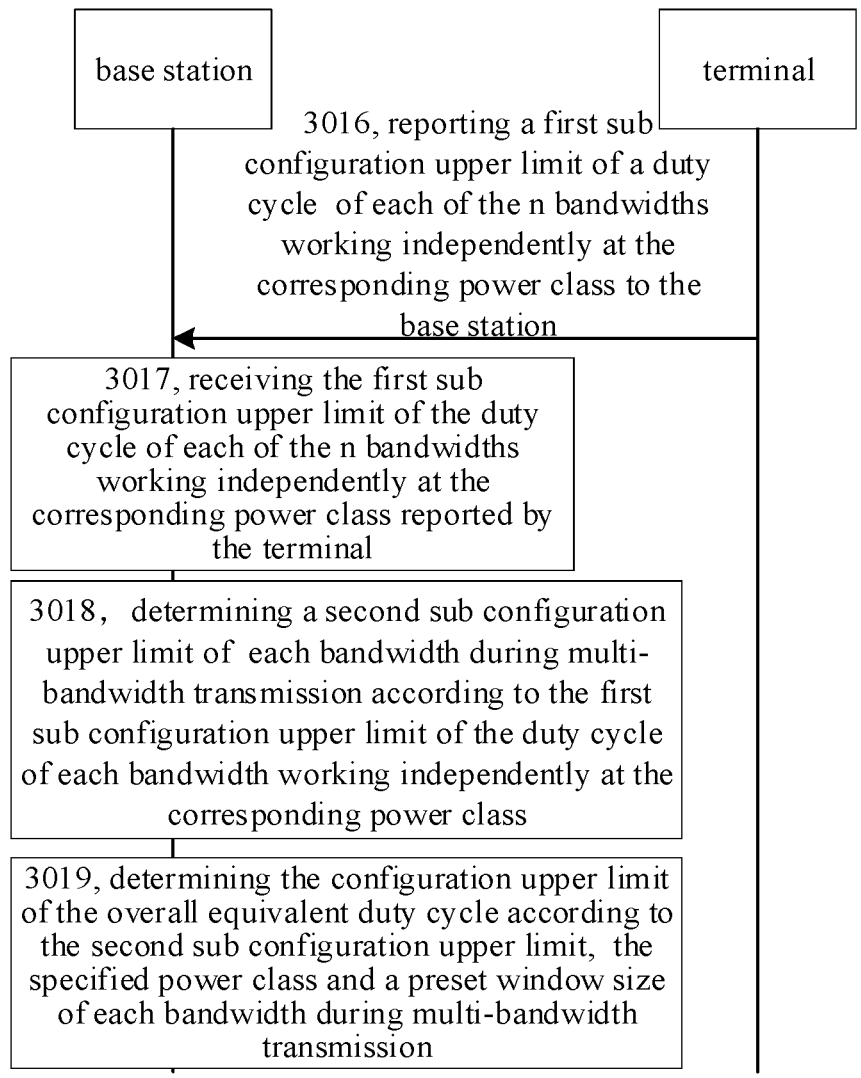
FIG. 8 is a flowchart illustrating a method for power configuration during multi-bandwidth transmission according to another example embodiment.

In a third implementation, as illustrated in FIG. 8, the configuration upper limit of the overall equivalent duty cycle is calculated by the base station. The process may include the following steps.

At step 3016, the terminal reports the first sub configuration upper limit of the duty cycle of each of the n bandwidths when working independently at the corresponding power class to the base station.

At step 3017, the base station receives the first sub configuration upper limit of the duty cycle of each of the n bandwidths when working independently at the corresponding power class, reported by the terminal.

At step 3018, the base station determines the second sub configuration upper limit of each bandwidth during multi-bandwidth transmission according to the first sub configuration upper limit of the duty cycle of each bandwidth when working independently at the corresponding power class.

The second sub configuration upper limit is less than the first sub configuration upper limit.

In an optional embodiment, the base station calculates an average value of the first sub configuration upper limits of the equivalent duty cycles of the n bandwidths when working independently at the corresponding power class, and determines a quotient value of the average value and n as the second sub configuration upper limit of each bandwidth during multi-bandwidth transmission.

In another optional embodiment, the base station calculates a maximum value of the first sub configuration upper limits of the equivalent duty cycles of the n bandwidths when working independently at the corresponding power class, and determines a quotient value of the maximum value and n as the second sub configuration upper limit of each bandwidth during multi-bandwidth transmission.

In another optional embodiment, the base station calculates a minimum value of the first sub configuration upper limits of the equivalent duty cycles of the n bandwidths when working independently at the corresponding power class, and determines a quotient value of the minimum value and n as the second sub configuration upper limit of each bandwidth during multi-bandwidth transmission.

In another embodiment, the base station calculates an average value of the first sub configuration upper limits of the equivalent duty cycles when the n bandwidths work independently at the corresponding power class, and determines n subdivision values after dividing the average value according to n weights as the second sub configuration upper limits of the n bandwidths during multi-bandwidth transmission, in which the n weights correspond to the n bandwidths one by one and the sum of the n weights is 1.

In another optional embodiment, the base station calculates a maximum value of the first sub configuration upper limits of the equivalent duty cycles when the n bandwidths work independently at the corresponding power class, and determines n subdivision values after dividing the maximum value according to n weights as the second sub configuration upper limits of the n bandwidths during multi-bandwidth transmission, in which the n weights correspond to the n bandwidths one by one and the sum of the n weights is 1.

In another embodiment, the base station calculates a minimum value of the first sub configuration upper limits of the equivalent duty cycles when the n bandwidths work independently at the corresponding power class, and determines n subdivision values after dividing the minimum value according to n weights as the second sub configuration upper limits of the n bandwidths during multi-bandwidth transmission, in which the n weights correspond to the n bandwidths one by one and the sum of the n weights is 1.

At step 3019, the base station determines the configuration upper limit of the overall equivalent duty cycle according to the second sub configuration upper limit and the specified power class of each bandwidth during multi-bandwidth transmission.

When the overall equivalent duty cycle is calculated by Formula (2), based on a similar calculation principle, for each of the n bandwidths, the base station multiplies the second sub configuration upper limit, the specified power class $P_{as\_j}$ and the evaluation time window of the bandwidth during multi-bandwidth transmission to obtain a third product corresponding to the bandwidth. The third products corresponding to the n bandwidths are accumulated to obtain the configuration upper limit of the overall equivalent duty cycle.

When the overall equivalent duty cycle is calculated by Formula 3, based on a similar calculation principle, for each of the n bandwidths, the base station multiplies the second sub configuration upper limit and the specified power class $P_{as\_j}$ of the bandwidth during multi-bandwidth transmission to obtain a fourth product corresponding to the bandwidth. The fourth products corresponding to the n bandwidths are accumulated to obtain the configuration upper limit of the overall equivalent duty cycle.

In another optional embodiment different from the above embodiments, each of the n bandwidths has its corresponding configuration upper limit of the duty cycle. When the base station configures the duty cycle and/or the power class of the jth bandwidth for the terminal, the configured equivalent duty cycle of the jth bandwidth shall not exceed the configuration upper limit corresponding to the jth bandwidth.

Figure 9:
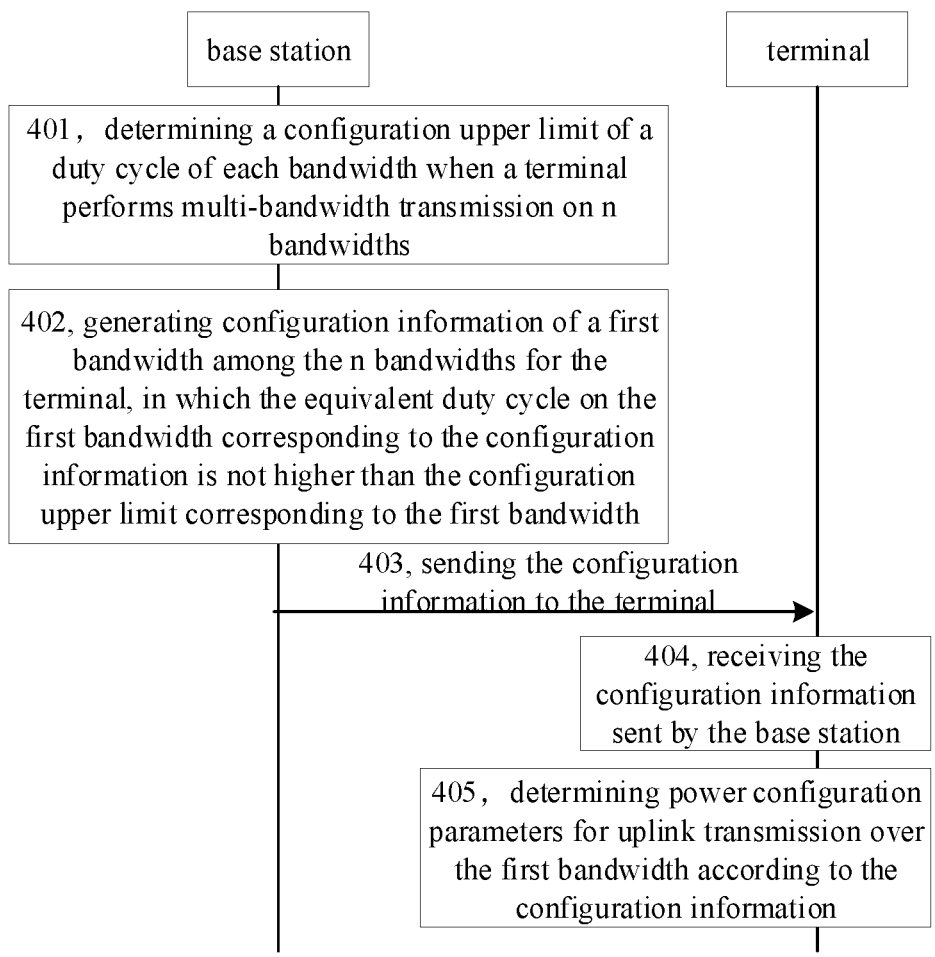
FIG. 9 is a flowchart illustrating a method for power configuration during multi-bandwidth transmission according to another example embodiment.

FIG. 9 is a flowchart illustrating a method for power configuration during multi-bandwidth transmission according to another example embodiment. The method may be executed by a communications system as illustrated in FIG. 2. The method includes followings.

At step 401, the base station determines the configuration upper limit of the duty cycle of each bandwidth when the terminal performs multi-bandwidth transmission on n bandwidths.

The terminal performs multi-bandwidth transmission on n bandwidths, in which n is an integer greater than 1. One configuration upper limit of the duty cycle may be configured for each of the n bandwidths.

The below Table illustrates a corresponding relationship between n bandwidths and configuration upper limits. Each bandwidth corresponds to its own configuration upper limit. The configuration upper limits corresponding to different bandwidths may be the same or different.

TABLE 1

| bandwidth | configuration upper limit |
|---|---|
| bandwidth 1 | duty cycle 1 |
| bandwidth 2 | duty cycle 2 |
| . . . | . . . |
| bandwidth n | duty cycle n |

At step 402, the base station generates configuration information of the first bandwidth among the n bandwidths for the terminal, in which the equivalent duty cycle on the first bandwidth corresponding to the configuration information is not greater than the configuration upper limit corresponding to the first bandwidth.

The first bandwidth is a bandwidth to be configured at this time among the n bandwidths, and the first bandwidth includes one or more of the n bandwidths, which is not limited here.

The base station generates the configuration information of the first bandwidth for the terminal, in which the configuration information is configured to configure power configuration parameters of the terminal for uplink transmission over the first bandwidth, and the power configuration parameters include a power class and/or a duty cycle.

When the base station generates configuration information of the first bandwidth for the terminal, the equivalent duty cycle is calculated according to the power configuration parameters corresponding to the configuration information, and the equivalent duty cycle for uplink transmission of the terminal over the first bandwidth is calculated according to the equivalent duty cycle, which ensures that the equivalent duty cycle is not greater than the configuration upper limit corresponding to the first bandwidth.

When the equivalent duty cycle is not greater than the configuration upper limit corresponding to the first bandwidth, step 403 is executed.

When the equivalent duty cycle is greater than the configuration upper limit corresponding to the first bandwidth, the base station reduces at least one of the power class and the duty cycle to regenerate configuration information of the first bandwidth. The reduction process may be performed multiple times, until the calculated equivalent duty cycle for uplink transmission of the terminal over the first bandwidth is not greater than the configuration upper limit corresponding to the first bandwidth.

At step 403, the base station sends the configuration information to the terminal.

At step 404, the terminal receives the configuration information sent by the base station.

At step 405, the terminal determines power configuration parameters for uplink transmission over the first bandwidth according to the configuration information.

The terminal determines a power class and/or a duty cycle for uplink transmission over the first bandwidth according to the configuration information.

In summary, in the method provided by the embodiment, through determining the configuration upper limit for each bandwidth during multi-bandwidth transmission, when the base station generates configuration information of the first bandwidth among the n bandwidths, it is only necessary to ensure that the equivalent duty cycle corresponding to the configuration information is not greater than the configuration upper limit corresponding to the first bandwidth, which simplifies a configuration logic for an uplink transmit power in a multi-bandwidth transmission scenario and reduces a calculation amount of the base station.

In an optional embodiment based on step 401, the above step 401 may include the following step 1.

1. The base station generates the configuration upper limit of the duty cycle of each bandwidth when the terminal performs multi-bandwidth transmission on n bandwidths.

Optionally, the base station generates the configuration upper limit of the duty cycle of each bandwidth when the terminal performs multi-bandwidth transmission on n bandwidths according to the requirement of SAR corresponding to the region or the operator.

Optionally, the base station further sends the configuration upper limit of the duty cycle of each bandwidth to the terminal after generating the configuration upper limit of the duty cycle of each bandwidth. Correspondingly, the terminal receives the configuration upper limit of the duty cycle configured by the base station when each of the n bandwidths works independently at the corresponding power class.

In another optional embodiment based on step 401, the above step 401 may include the following step 2.

2. The base station receives the configuration upper limit of the equivalent duty cycle of each bandwidth for transmission on n bandwidths, sent by the terminal.

Optionally, the terminal generates the configuration upper limit of the duty cycle of each bandwidth during multi-bandwidth transmission on n bandwidths according to the requirement of SAR corresponding to the region or the operator, and sends the configuration upper limit of the duty cycle of each bandwidth to the base station. Correspondingly, the base station receives the configuration upper limit of the equivalent duty cycle of each bandwidth for transmission on the n bandwidths, sent by the terminal.

It needs to be noted that, the above step 1 and step 2 may be implemented based on a new signaling. The new signaling includes but not limited to at least one of a physical layer control signaling, an upper layer RRC/MAC CE signaling and a broadcast signaling.

The following are apparatus embodiments of the present disclosure, which may be configured to implement the method embodiments of the present disclosure. For details not disclosed in the apparatus embodiments of the present disclosure, please refer to the method embodiments of the present disclosure.

Figure 10:
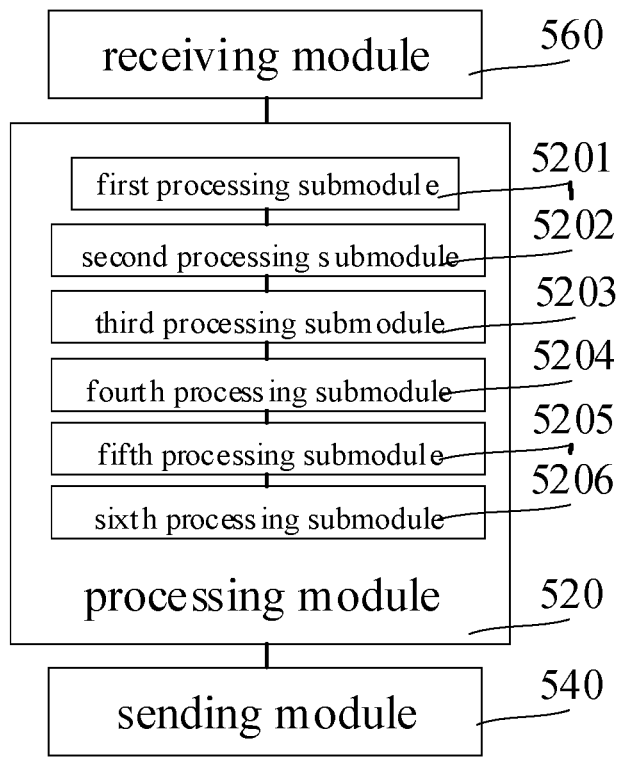
FIG. 10 is a block diagram illustrating an apparatus for power configuration during multi-bandwidth transmission according to an example embodiment.

FIG. 10 is a block diagram illustrating an apparatus for power configuration during multi-bandwidth transmission according to an example embodiment. The apparatus may be implemented as a part or all of an access network device through software, hardware or their combination. The apparatus may include a processing module 520 and a sending module 540.

The processing module 520 is configured to determine a configuration upper limit of an overall equivalent duty cycle when a terminal performs multi-bandwidth transmission on n bandwidths, where n is an integer greater than 1.

The processing module 520 is further configured to generate configuration information of a first bandwidth among the n bandwidths for the terminal, in which the overall equivalent duty cycle on n bandwidths corresponding to the configuration information is not greater than the configuration upper limit.

The sending module 540 is configured to send the configuration information to the terminal, in which the configuration information is configured to configure power configuration parameters of the terminal for uplink transmission over the first bandwidth.

In some embodiments, the processing module 520 includes a first processing submodule 5201, a second processing submodule 5202 and a third processing submodule 5203.

The first processing submodule 5201 is configured to obtain an equivalent duty cycle of the terminal corresponding to each of the n bandwidths, wherein, the n bandwidths comprise a first bandwidth configured at this time.

The second processing submodule 5202 is configured to calculate the overall equivalent duty cycle of the terminal according to the equivalent duty cycle and a specified power class of the terminal corresponding to each bandwidth.

The third processing submodule 5203 is configured to, when the overall equivalent duty cycle of the base station is not greater than the configuration upper limit, generate the configuration information of the first bandwidth, wherein the configuration information of the first bandwidth is configured to configure a first duty cycle and/or a first power class of the terminal on the first bandwidth.

In some embodiments, the second processing submodule 5202 is configured to, for each of the n bandwidths, multiply the equivalent duty cycle, the specified power class and an evaluation time window corresponding to the bandwidth to obtain a first product corresponding to the bandwidth; accumulate the first products corresponding to the n bandwidths to obtain the overall equivalent duty cycle;

or, for each of the n bandwidths, multiply the equivalent duty cycle and the specified power class corresponding to the bandwidth to obtain a second product corresponding to the bandwidth; accumulate the second products corresponding to the n bandwidths to obtain the overall equivalent duty cycle.

In some embodiments, for a jth bandwidth among the n bandwidths, the equivalent duty cycle corresponding to the jth bandwidth is equal to:

$$DC_{eq\_Band\_j}=(DC_{p1} \times P_1 \times T_1 + DC_{p2} \times P_2 \times T_2 + DC_{p3} \times P_3 \times T_3 + \ldots + DC_{pi} \times P_i \times T_i + \ldots + DC_{pn} \times P_n \times T_n)/(P_{as\_j} \times T_{window})$$

where, $DC_{eq\_Band\_j}$ is the equivalent duty cycle of the jth bandwidth at the specified power class; $P_{as\_j}$ is a transmission power of the specified power class corresponding to the jth bandwidth; $T_{window}$ is an entire evaluation time window; $DC_{pi}$ is a duty cycle during an ith sub evaluation time period; $P_i$ is a power corresponding to an actual power class during the ith sub evaluation time period; $T_i$ is an ith sub evaluation time period; respective sub evaluation time periods are non-overlapped, and i is an integer not greater than n.

In some embodiments, the first processing submodule 5201 is configured to calculate the equivalent duty cycle corresponding to each bandwidth according to a default duty cycle and a preset power class corresponding to each of the n bandwidths.

In some embodiments, the first processing submodule 5201 is configured to, when there is a need to adjust the first duty cycle and the first power class of the first bandwidth, adjust at least one of the first duty cycle and the first power class of the first bandwidth according to an adjustment requirement, and calculate the equivalent duty cycle corresponding to the first bandwidth according to the first duty cycle and the first power class;

obtain a second duty cycle and a second power class of a second bandwidth in addition to the first bandwidth among the n bandwidths, and obtain an equivalent duty cycle corresponding to the second bandwidth according to the second duty cycle and the second power class, or, obtain an equivalent duty cycle corresponding to the second bandwidth among the n bandwidths in addition to the first bandwidth.

In some embodiments, the first processing submodule 5201 is further configured to, when the overall equivalent duty cycle is greater than the configuration upper limit, reduce the second duty cycle and/or the second power class of the second bandwidth.

In some embodiments, the first processing submodule 5201 is further configured to, when a number of times of reducing is greater than a preset number of times and the overall equivalent duty cycle is still greater than the configuration upper limit, refuse to adjust the second duty cycle and/or the second power class of the second bandwidth.

In some embodiments, the first processing submodule 5201 is further configured to, when the overall equivalent duty cycle is greater than the configuration upper limit, and a business priority of the second bandwidth is greater than a business priority of the first bandwidth, reduce the first equivalent duty cycle and/or the first power class of the first bandwidth.

In some embodiments, the processing module 520 includes a fourth processing submodule 5204. The fourth processing submodule 5204 is configured to, when the overall equivalent duty cycle is not greater than the configuration upper limit, calculate a remaining equivalent duty cycle quota according to the configuration upper limit and the overall equivalent duty cycle; when there is a need to adjust an equivalent duty cycle and a power class of a third bandwidth, adjust at least one of the third duty cycle and the third power class of the third bandwidth according to an adjustment requirement; calculate an increment of the equivalent duty cycle of the third bandwidth according to the third duty cycle and/or the third power class of the third bandwidth; when the increment of the equivalent duty cycle of the third bandwidth is not greater than the remaining equivalent duty cycle quota, generate configuration information of the third bandwidth, wherein the configuration information of the third bandwidth is configured to configure the third duty cycle and/or the third power class of the terminal on the third bandwidth.

In some embodiments, the apparatus further includes a receiving module 560. The receiving module 560 is configured to receive the configuration upper limit of the overall equivalent duty cycle reported by the terminal.

In some embodiments, the apparatus further includes a receiving module 560.

The receiving module 560 is configured to receive a first sub configuration upper limit of a duty cycle of each of the n bandwidths working independently at the corresponding power class, reported by the terminal.

The processing module 520 is configured to determine a second sub configuration upper limit of each bandwidth during multi-bandwidth transmission according to the first sub configuration upper limit of the duty cycle of each bandwidth working independently at the corresponding power class, in which the second sub configuration upper limit is less than the first sub configuration upper limit; determine the configuration upper limit of the overall equivalent duty cycle according to the second sub configuration upper limit and the specified power class of each bandwidth during multi-bandwidth transmission.

In some embodiments, the processing module 520 includes a fifth processing submodule 5205. The fifth processing submodule 5205 is configured to calculate an average value of the first sub configuration upper limits of the equivalent duty cycles of the n bandwidths working independently at the corresponding power class, and determine a quotient value of the average value and n as the second sub configuration upper limit of each bandwidth during multi-bandwidth transmission.

Or, the fifth processing submodule is configured to calculate a maximum value of the first sub configuration upper limits of the equivalent duty cycles of the n bandwidths working independently at the corresponding power class, and determine a quotient value of the maximum value and n as the second sub configuration upper limit of each bandwidth during multi-bandwidth transmission.

Or, fifth processing submodule is configured to calculate a minimum value of the first sub configuration upper limits of the equivalent duty cycles of the n bandwidths working independently at the corresponding power class, and determine a quotient value of the minimum value and n as the second sub configuration upper limit of each bandwidth during multi-bandwidth transmission.

Or, the fifth processing submodule is configured to calculate an average value of the first sub configuration upper limits of the equivalent duty cycles of the n bandwidths working independently at the corresponding power class, and determine n subdivision values after dividing the average value according to n weights as the second sub configuration upper limits of the n bands during multi-bandwidth transmission, in which the n weights correspond to the n bandwidths one by one and a sum of the n weights is 1.

Or, the fifth processing submodule is configured to calculate a maximum value of the first sub configuration upper limits of the equivalent duty cycles of the n bandwidths working independently at the corresponding power class, and determine n subdivision values after dividing the maximum value according to n weights as the second sub configuration upper limits of the n bands during multi-bandwidth transmission, in which the n weights correspond to the n bandwidths one by one and a sum of the n weights is 1.

Or, the fifth processing submodule is configured to calculate a minimum value of the first sub configuration upper limits of the equivalent duty cycles of the n bandwidths working independently at the corresponding power class, and determine n subdivision values after dividing the minimum value according to n weights as the second sub configuration upper limits of the n bands during multi-bandwidth transmission, in which the n weights correspond to the n bandwidths one by one and a sum of the n weights is 1.

In some embodiments, the processing module 520 includes a sixth processing submodule 5206.

The sixth processing submodule 5206 is configured to, for each of the n bandwidths, multiply the second sub configuration upper limit, the power class $P_{as\_j}$ and an evaluation time window of the bandwidth during the multi-bandwidth transmission to obtain a third product corresponding to the bandwidth, and accumulate the third products corresponding to the n bandwidths to obtain the configuration upper limit of the overall equivalent duty cycle; or, for each of the n bandwidths, multiply the second sub configuration upper limit and the specified power class $P_{as\_j}$ of the bandwidth during multi-bandwidth transmission to obtain a fourth product corresponding to the bandwidth, and accumulate the fourth products corresponding to the n bandwidths to obtain the configuration upper limit of the overall equivalent duty cycle.

Figure 11:
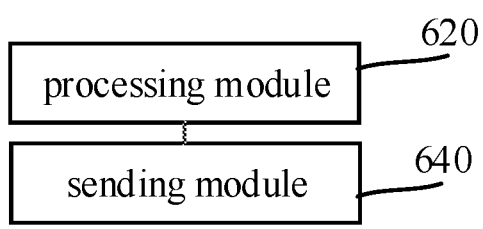
FIG. 11 is a block diagram illustrating an apparatus for power configuration during multi-bandwidth transmission according to another example embodiment.

FIG. 11 is a block diagram illustrating an apparatus for power configuration during multi-bandwidth transmission according to an example embodiment. The apparatus may be implemented as a part or all of an access network device through software, hardware or their combination. The apparatus may include a processing module 620 and a sending module 640.

The processing module 620 is configured to determine a configuration upper limit of a duty cycle of each bandwidth when a terminal performs multi-bandwidth transmission on n bandwidths, where n is an integer greater than 1.

The processing module 620 is configured to generate configuration information of a first bandwidth among the n bandwidths for the terminal, wherein an equivalent duty cycle on the first bandwidth corresponding to the configuration information is not greater than a configuration upper limit corresponding to the first bandwidth.

The sending module 640 is configured to send the configuration information to the terminal, wherein the configuration information is configured to configure power configuration parameters of the terminal for uplink transmission over the first bandwidth.

In an optional embodiment, the processing module 620 is configured to generate the configuration upper limit of the equivalent duty cycle of each bandwidth when the terminal performs multi-bandwidth transmission on n bandwidths; or, the processing module 620 is configured to receive the configuration upper limit of the equivalent duty cycle of each bandwidth during multi-bandwidth transmission on n bandwidths sent by the terminal.

Figure 12:
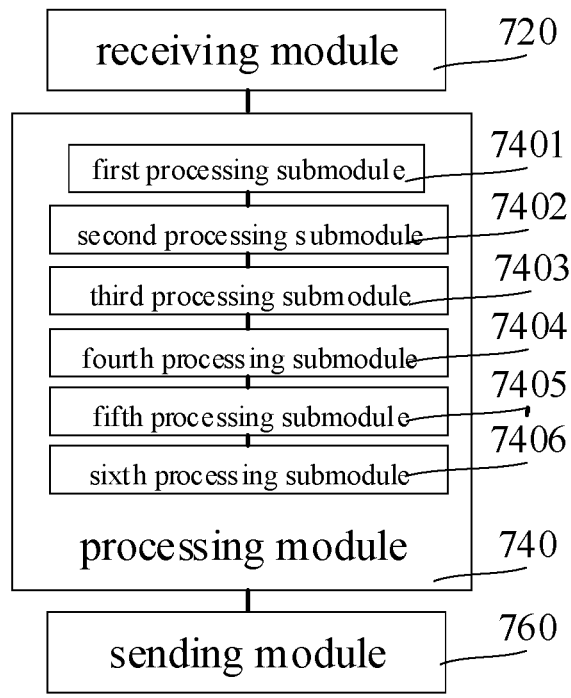
FIG. 12 is a block diagram illustrating an apparatus for power configuration during multi-bandwidth transmission according to another example embodiment.

FIG. 12 is a block diagram illustrating an apparatus for power configuration during multi-bandwidth transmission according to an example embodiment. The apparatus may be implemented as a part or all of an electronic device through software, hardware or their combination. The apparatus includes a receiving module 720 and a processing module 740.

The receiving module 720 is configured to receive configuration information sent by a base station.

The processing module 740 is configured to determine power configuration parameters for uplink transmission over a first bandwidth according to the configuration information, in which, on n bandwidths in a multi-bandwidth transmission scenario, an overall equivalent duty cycle of the terminal configured by the configuration information is not greater than a configuration upper limit.

In some embodiments, the apparatus further includes a sending module 760. The sending module 760 is configured to report the configuration upper limit of the overall equivalent duty cycle to the base station.

In some embodiments, the processing module 740 includes a first processing submodule 7401 and a second processing submodule 7402.

The first processing submodule 7401 is configured to obtain a sub configuration upper limit of a duty cycle of a fourth bandwidth among the n bandwidths working independently at the corresponding power class.

The second processing submodule 7402 is configured to determine the sub configuration upper limit as the configuration upper limit of the overall equivalent duty cycle.

In some embodiments, the processing module 740 includes a third processing submodule 7403, a fourth processing submodule 7404 and a fifth processing submodule 7405.

The third processing submodule 7403 is configured to obtain a first sub configuration upper limit of a duty cycle of each of the n bandwidths working independently at a corresponding power class.

The fourth processing submodule 7404 is configured to determine a second sub configuration upper limit of each bandwidth during multi-bandwidth transmission according to the first sub configuration upper limit of the duty cycle of each bandwidth working independently at the corresponding power class, in which the second sub configuration upper limit is less than the first sub configuration upper limit.

The fifth processing submodule 7405 is configured to determine the configuration upper limit of the overall equivalent duty cycle according to the second sub configuration upper limit and a specified power class of each bandwidth during multi-bandwidth transmission.

In some embodiments, the processing module 740 includes a sixth processing submodule 7406.

The sixth processing submodule 7406 is configured to calculate an average value of the first sub configuration upper limits of the equivalent duty cycles of the n bandwidths working independently at the corresponding power class, and determine a quotient value of the average value and n as the second sub configuration upper limit of each bandwidth during multi-bandwidth transmission.

Or, the sixth processing submodule 7406 is configured to calculate a maximum value of the first sub configuration upper limits of the equivalent duty cycles of the n bandwidths working independently at the corresponding power class, and determine a quotient value of the maximum value and n as the second sub configuration upper limit of each bandwidth during multi-bandwidth transmission.

Or, the sixth processing submodule 7406 is configured to calculate a minimum value of the first sub configuration upper limits of the equivalent duty cycles of the n bandwidths working independently at the corresponding power class, and determine a quotient value of the minimum value and n as the second sub configuration upper limit of each bandwidth during multi-bandwidth transmission.

Or, the sixth processing submodule 7406 is configured to calculate an average value of the first sub configuration upper limits of the equivalent duty cycles of the n bandwidths working independently at the corresponding power class, and determine n subdivision values after dividing the average value according to n weights as the second sub configuration upper limits of the n bandwidths during multi-bandwidth transmission, in which the n weights correspond to the n bandwidths one by one and a sum of the n weights is 1.

Or, the sixth processing submodule 7406 is configured to calculate a maximum value of the first sub configuration upper limits of the equivalent duty cycles of the n bandwidths working independently at the corresponding power class, and determining n subdivision values after dividing the maximum value according to n weights as the second sub configuration upper limits of the n bandwidths during multi-bandwidth transmission, in which the n weights correspond to the n bandwidths one by one and a sum of the n weights is 1.

Or, the sixth processing submodule 7406 is configured to calculate a minimum value of the first sub configuration upper limits of the equivalent duty cycles of the n bandwidths working independently at the corresponding power class, and determining n subdivision values after dividing the minimum value according to n weights as the second sub configuration upper limits of the n bandwidths during multi-bandwidth transmission, in which the n weights correspond to the n bandwidths one by one and a sum of the n weights is 1.

In some embodiments, the fifth processing submodule 7405 is configured to, for each of the n bandwidths, the second sub configuration upper limit, a specified power class $P_{as\_j}$ and an evaluation time window of the bandwidth during multi-bandwidth transmission to obtain a third product corresponding to the bandwidth, and accumulate the third products corresponding to the n bandwidths to obtain the configuration upper limit of the overall equivalent duty cycle; or, for each of the n bandwidths, multiply the second sub configuration upper limit and the specified power class $P_{as\_j}$ of the bandwidth during multi-bandwidth transmission to obtain a fourth product corresponding to the bandwidth, and accumulate the fourth products corresponding to the n bandwidths to obtain the configuration upper limit of the overall equivalent duty cycle.

In some embodiments, the sending module 760 is configured to report a first sub configuration upper limit of a duty cycle of each of the n bandwidths working independently at the corresponding power class to the base station.

Figure 13:
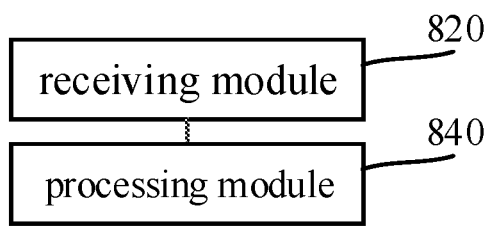
FIG. 13 is a block diagram illustrating an apparatus for power configuration during multi-bandwidth transmission according to another example embodiment.

FIG. 13 is a block diagram illustrating an apparatus for power configuration during multi-bandwidth transmission according to an example embodiment. The apparatus may be implemented as a part or all of an electronic device through software, hardware or their combination. The apparatus includes a receiving module 820 and a processing module 840.

The receiving module 820 is configured to receive configuration information sent by the base station.

The processing module 840 is configured to determine power configuration parameters for uplink transmission over a first bandwidth according to the configuration information, in which on n bandwidths in a multi-bandwidth transmission scenario, an equivalent duty cycle on the first bandwidth of the terminal configured by the configuration information is not greater than a configuration upper limit corresponding to the first bandwidth.

In an optional embodiment, the apparatus further includes a sending module 860.

The sending module 860 is configured to report a configuration upper limit of a duty cycle of each of the n bandwidths working independently at a corresponding power class to the base station; or, the receiving module 820 is configured to receive a configuration upper limit of a duty cycle of each of the n bandwidths working independently at a corresponding power class, configured by the base station.

Figure 14:
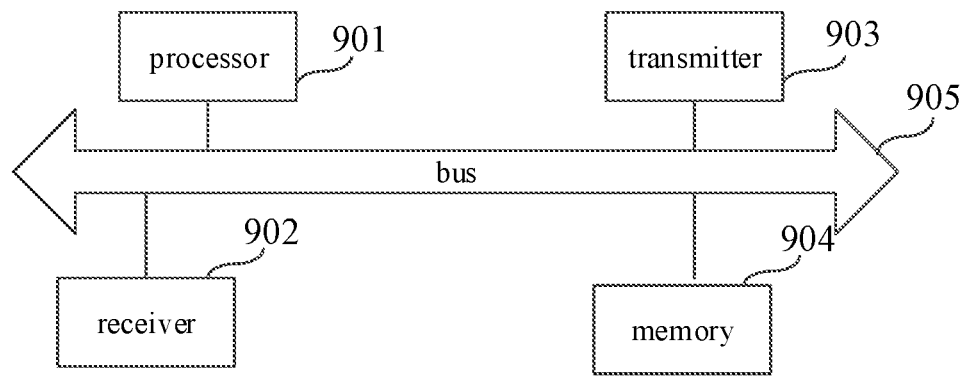
FIG. 14 is a schematic diagram illustrating a structure of a terminal according to an example embodiment.

FIG. 14 is a schematic diagram illustrating a structure of a terminal provided according to an example embodiment. The terminal includes a processor 901, a receiver 902, a transmitter 903, a memory 904 and a bus 905.

The processor 901 includes one or more processing cores, and the processor 901 executes various function applications and information processing by running a software program or a module.

The receiver 902 and the transmitter 903 may be implemented as one communication component, which may be a communication chip.

The memory 904 is coupled to the processor 901 through the bus 905.

The memory 904 may be configured to store at least one instruction, and the processor 901 is configured to execute the at least one instruction to implement various steps in the above embodiment.

In addition, the memory 904 may be implemented by any type of volatile or non-volatile storage devices or their combination. The volatile or non-volatile storage device includes but not limited to a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In an exemplary embodiment, a non-temporary computer readable storage medium including instructions is further provided, such as the memory including instructions, in which the instructions may be executed by the processor of the terminal to complete the above method for power configuration during multi-bandwidth transmission performed by a terminal side.

For example, the non-temporary computer readable storage medium may be a ROM, a random access memory (RAM), a CD-ROM, a magnetic tape, a floppy disk, an optical data storage device, etc.

A non-transitory computer readable storage medium is further provided. When the instructions in the non-transitory computer readable storage medium are executed by the processor of the terminal, the terminal is enabled to execute the method for power configuration during multi-bandwidth transmission.

Figure 15:
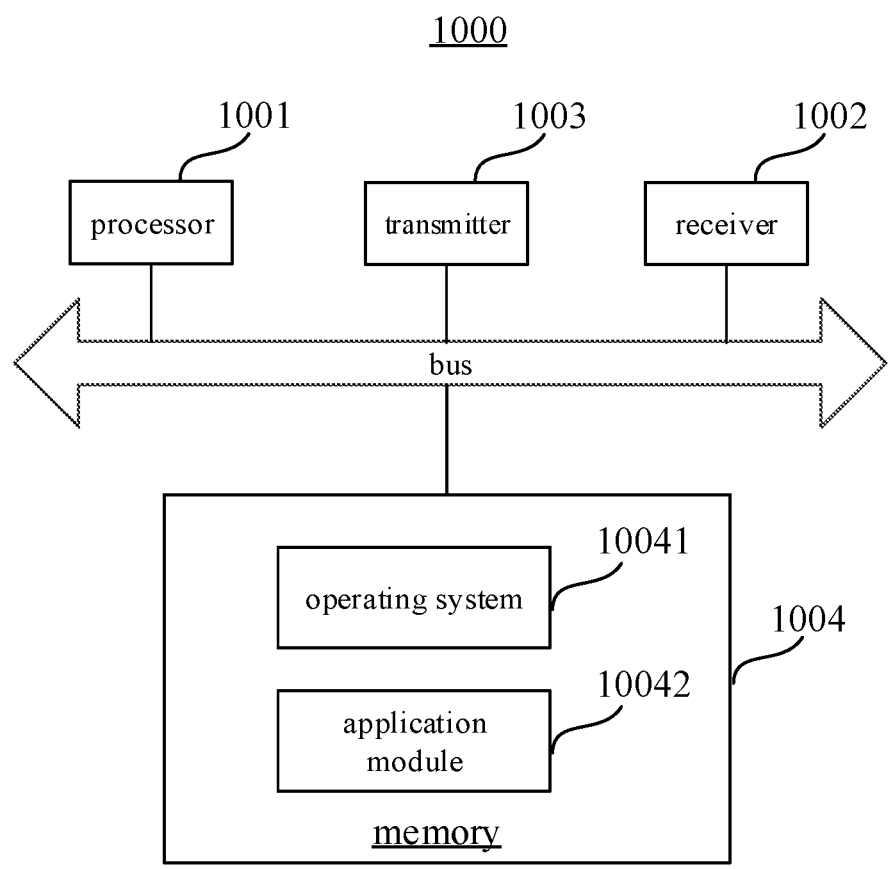
FIG. 15 is a block diagram illustrating an access network device according to an example embodiment.

FIG. 15 is a block diagram illustrating an access network device 1000 according to an example embodiment. The access network device 1000 may be a base station.

The access network device 1000 may include a processor 1001, a receiver 1002, a transmitter 1003 and a memory 1004. The receiver 1002, the transmitter 1003 and the memory 1004 are connected to the processor 1001 through the bus.

The processor 1001 includes one or more processing cores, and the processor 1001 implements the method for power configuration during multi-bandwidth transmission provided by embodiments of the present disclosure by running software programs and modules. The memory 1004 may be configured to store software programs and modules. Specifically, the memory 1004 may store an operating system 10041 and an application module 10042 required by at least one function. The receiver 1002 is configured to receive the communication data transmitted by other devices, and the transmitter 1003 is configured to transmit the communication data transmitted by other devices.

One example embodiment of the present disclosure further provides a system for power configuration during multi-bandwidth transmission (or a communications system). The system includes a terminal and an access network device.

The terminal includes an apparatus for power configuration during multi-bandwidth transmission provided in embodiments of FIG. 12 or FIG. 13.

The access network includes an apparatus for power configuration during multi-bandwidth transmission provided in embodiments of FIG. 10 or FIG. 11.

One example embodiment of the present disclosure further provides a system for power configuration during multi-bandwidth transmission (or a communications system). The system includes a terminal and an access network device.

The terminal includes a terminal provided in the embodiment as illustrated in FIG. 14.

The access network device includes an access network device provided in the embodiment as illustrated in FIG. 15.

One example embodiment of the present disclosure further provides a computer readable storage medium, in which the computer readable storage medium stores at least one instruction, at least one program, a code set and an instruction set, the at least one instruction, and the at least one program, the code set or the instruction set are configured to be loaded and executed by the processor to implement the steps executed by the first terminal or the access network device in the method for power configuration during multi-bandwidth transmission provided in each method embodiment.

It should be understood that, "more" mentioned in this disclosure refers to two or more. "and/or", describes the relationship of the association objects, indicating that there may exist three relationships, for example, A and/or B, may represent: any of existing A only, existing both A and B, or existing B only. The character "/" generally means the contextual object is a kind of "or" relationship.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for power configuration for multi-bandwidth transmission, comprising:
   determining by a base station, a configuration upper limit of an overall equivalent duty cycle when a terminal performs multi-bandwidth transmission on n bandwidths, where n is an integer greater than 1;
   generating by the base station, configuration information of a first bandwidth among the n bandwidths for the terminal, wherein the overall equivalent duty cycle on the n bandwidths corresponding to the configuration information is not greater than the configuration upper limit;
   sending the configuration information to the terminal by the base station, wherein the configuration information is configured to configure power configuration parameters of the terminal for uplink transmission over the first bandwidth.

2. The method of claim 1, wherein, generating by the base station, configuration information of the first bandwidth among the n bandwidths for the terminal, comprises:
   obtaining by the base station, an equivalent duty cycle of the terminal corresponding to each of the n bandwidths, wherein, the n bandwidths comprise the first bandwidth configured at this time;
   calculating by the base station, the overall equivalent duty cycle of the terminal according to the equivalent duty cycle and a specified power class of the terminal corresponding to each bandwidth;
   when the overall equivalent duty cycle of the base station is not greater than the configuration upper limit, generating the configuration information of the first bandwidth, wherein the configuration information of the first bandwidth is configured to configure a first duty cycle and/or a first power class of the terminal on the first bandwidth.

3. The method of claim 2, wherein, calculating by the base station, the overall equivalent duty cycle of the terminal according to the equivalent duty cycle of the terminal corresponding to each bandwidth, comprises:
   for each of the n bandwidths, multiplying the equivalent duty cycle, the specified power class and an evaluation time window corresponding to the bandwidth to obtain a first product corresponding to the bandwidth; accumulating the first products corresponding to the n bandwidths to obtain the overall equivalent duty cycle; or,
   for each of the n bandwidths, multiplying the equivalent duty cycle and the specified power class corresponding to the bandwidth to obtain a second product corresponding to the bandwidth; accumulating the second products corresponding to the n bandwidths to obtain the overall equivalent duty cycle.

4. The method of claim 2, wherein, obtaining by the base station, the equivalent duty cycle of the terminal corresponding to each of the n bandwidths, comprises:
   calculating the equivalent duty cycle corresponding to each bandwidth according to a default duty cycle and a preset power class corresponding to each of the n bandwidths.

5. The method of claim 2, wherein, obtaining by the base station, the equivalent duty cycle of the terminal corresponding to each of the n bandwidths, comprises:
   when there is a need to adjust the first duty cycle and the first power class of the first bandwidth, adjusting at least one of the first duty cycle and the first power class of the first bandwidth according to an adjustment requirement, and calculating the equivalent duty cycle corresponding to the first bandwidth according to the first duty cycle and the first power class;
   obtaining a second duty cycle and a second power class of a second bandwidth in addition to the first bandwidth among the n bandwidths, and obtaining an equivalent duty cycle corresponding to the second bandwidth according to the second duty cycle and the second power class, or, obtaining an equivalent duty cycle corresponding to the second bandwidth among the n bandwidths in addition to the first bandwidth.

6. The method of claim 5, further comprising:
   when the overall equivalent duty cycle is greater than the configuration upper limit, reducing by the base station, the second duty cycle and/or the second power class of the second bandwidth; and
   when a number of times of reducing is greater than a preset number of times and the overall equivalent duty cycle is still greater than the configuration upper limit, refusing by the base station, to adjust the second duty cycle and/or the second power class of the second bandwidth.

7. The method of claim 4, further comprising:
when the overall equivalent duty cycle is greater than the configuration upper limit, and a business priority of the second bandwidth is greater than a business priority of the first bandwidth, reducing by the base station, the first equivalent duty cycle and/or the first power class of the first bandwidth.

8. The method of claim 2, further comprising:
when the overall equivalent duty cycle is not greater than the configuration upper limit, calculating a remaining equivalent duty cycle quota according to the configuration upper limit and the overall equivalent duty cycle;
when there is a need to adjust an equivalent duty cycle and a power class of a third bandwidth, adjusting at least one of the third duty cycle and the third power class of the third bandwidth according to an adjustment requirement;
calculating an increment of the equivalent duty cycle of the third bandwidth according to the third duty cycle and/or the third power class of the third bandwidth;
when the increment of the equivalent duty cycle of the third bandwidth is not greater than the remaining equivalent duty cycle quota, generating configuration information of the third bandwidth, wherein the configuration information of the third bandwidth is configured to configure the third duty cycle and/or the third power class of the terminal on the third bandwidth.

9. The method of claim 1, wherein, determining by the base station, the configuration upper limit of the overall equivalent duty cycle when the terminal performs multi-bandwidth transmission on n bandwidths, comprises:
receiving by the base station, the configuration upper limit of the overall equivalent duty cycle reported by the terminal; or
receiving by the base station, a first sub configuration upper limit of a duty cycle of each of the n bandwidths working independently at a corresponding power class, reported by the terminal; determining a second sub configuration upper limit of each bandwidth during multi-bandwidth transmission by the base station according to the first sub configuration upper limit of the duty cycle of each bandwidth working independently at the corresponding power class, in which the second sub configuration upper limit is less than the first sub configuration upper limit; and determining by the base station, the configuration upper limit of the overall equivalent duty cycle according to the second sub configuration upper limit and the specified power class of each bandwidth during multi-bandwidth transmission.

10. The method of claim 9, wherein, determining the second sub configuration upper limit of each bandwidth during multi-bandwidth transmission by the base station according to the first sub configuration upper limit of the equivalent duty cycle of each bandwidth working independently at the corresponding power class, comprises:
calculating by the base station, an average value of the first sub configuration upper limits of the equivalent duty cycles of the n bandwidths working independently at the corresponding power class, and determining a quotient value of the average value and n as the second sub configuration upper limit of each bandwidth during multi-bandwidth transmission;
or,
calculating by the base station, a maximum value of the first sub configuration upper limits of the equivalent duty cycles of the n bandwidths working independently at the corresponding power class, and determining a quotient value of the maximum value and n as the second sub configuration upper limit of each bandwidth during multi-bandwidth transmission;
or,
calculating by the base station, a minimum value of the first sub configuration upper limits of the equivalent duty cycles of the n bandwidths working independently at the corresponding power class, and determining a quotient value of the minimum value and n as the second sub configuration upper limit of each bandwidth during multi-bandwidth transmission;
or,
calculating by the base station, an average value of the first sub configuration upper limits of the equivalent duty cycles of the n bandwidths working independently at the corresponding power class, and determining n subdivision values after dividing the average value according to n weights as the second sub configuration upper limits of the n bands during multi-bandwidth transmission, in which the n weights correspond to the n bandwidths one by one and a sum of the n weights is 1;
or,
calculating by the base station, a maximum value of the first sub configuration upper limits of the equivalent duty cycles of the n bandwidths working independently at the corresponding power class, and determining n subdivision values after dividing the maximum value according to n weights as the second sub configuration upper limits of the n bands during multi-bandwidth transmission, in which the n weights correspond to the n bandwidths one by one and a sum of the n weights is 1;
or,
calculating by the base station, a minimum value of the first sub configuration upper limits of the equivalent duty cycles of the n bandwidths working independently at the corresponding power class, and determining n subdivision values after dividing the minimum value according to n weights as the second sub configuration upper limits of the n bands during multi-bandwidth transmission, in which the n weights correspond to the n bandwidths one by one and a sum of the n weights is 1.

11. The method of claim 9, wherein, determining by the base station, the configuration upper limit of the overall equivalent duty cycle according to the second sub configuration upper limit, the power class and the evaluation time window of each bandwidth during multi-bandwidth transmission, comprises:
for each of the n bandwidths, multiplying the second sub configuration upper limit, the power class $P_{as\_j}$ and the evaluation time window of the bandwidth during multi-bandwidth transmission, to obtain a third product corresponding to the bandwidth;
accumulating the third products corresponding to the n bandwidths to obtain the configuration upper limit of the overall equivalent duty cycle.

12. A method for power configuration during multi-bandwidth transmission, comprising:
determining by a base station, a configuration upper limit of a duty cycle of each bandwidth when a terminal performs multi-bandwidth transmission on n bandwidths, where n is an integer greater than 1;

generating by the base station, configuration information of a first bandwidth among the n bandwidths for the terminal, wherein an equivalent duty cycle on the first bandwidth corresponding to the configuration information is not greater than a configuration upper limit corresponding to the first bandwidth;

sending the configuration information to the terminal by the base station, wherein the configuration information is configured to configure power configuration parameters of the terminal for uplink transmission over the first bandwidth.

13. A method for power configuration during multi-bandwidth transmission, comprising:

obtaining by a terminal, a sub configuration upper limit of a duty cycle of a fourth bandwidth among n bandwidths working independently at a corresponding power class;

determining by the terminal, the sub configuration upper limit as a configuration upper limit of an overall equivalent duty cycle;

reporting by the terminal, the configuration upper limit of the overall equivalent duty cycle to a base station;

receiving by the terminal, configuration information sent by the base station; and determining by the terminal, power configuration parameters for uplink transmission over a first bandwidth according to the configuration information, in which, on n bandwidths in a multi-bandwidth transmission scenario, the overall equivalent duty cycle of the terminal configured by the configuration information is not greater than the configuration upper limit.

14. The method of claim 13, before reporting by the terminal, the configuration upper limit of the overall equivalent duty cycle to the base station, further comprising: obtaining by the terminal, a first sub configuration upper limit of a duty cycle of each of the n bandwidths working independently at a corresponding power class; determining a second sub configuration upper limit of each bandwidth during multi-bandwidth transmission by the terminal according to the first sub configuration upper limit of the duty cycle of each bandwidth working independently at the corresponding power class, in which the second sub configuration upper limit is less than the first sub configuration upper limit; determining by the terminal, the configuration upper limit of the overall equivalent duty cycle according to the second sub configuration upper limit and a specified power class of each bandwidth during multi-bandwidth transmission.

15. The method of claim 14, wherein, determining the second sub configuration upper limit of each bandwidth during multi-bandwidth transmission by the terminal according to the first sub configuration upper limit of the equivalent duty cycle of each bandwidth working independently at the corresponding power class, comprises:

calculating by the terminal, an average value of the first sub configuration upper limits of the equivalent duty cycles of the n bandwidths working independently at the corresponding power class, and determining a quotient value of the average value and n as the second sub configuration upper limit of each bandwidth during multi-bandwidth transmission;

or, calculating by the terminal, a maximum value of the first sub configuration upper limits of the equivalent duty cycles of the n bandwidths working independently at the corresponding power class, and determining a quotient value of the maximum value and n as the second sub configuration upper limit of each bandwidth during multi-bandwidth transmission;

or, calculating by the terminal, a minimum value of the first sub configuration upper limits of the equivalent duty cycles of the n bandwidths working independently at the corresponding power class, and determining a quotient value of the minimum value and n as the second sub configuration upper limit of each bandwidth during multi-bandwidth transmission;

or, calculating by the terminal, an average value of the first sub configuration upper limits of the equivalent duty cycles of the n bandwidths working independently at the corresponding power class, and determining n subdivision values after dividing the average value according to n weights as the second sub configuration upper limits of the n bandwidths during multi-bandwidth transmission, in which the n weights correspond to the n bandwidths one by one and a sum of the n weights is 1;

or, calculating by the terminal, a maximum value of the first sub configuration upper limits of the equivalent duty cycles of the n bandwidths working independently at the corresponding power class, and determining n subdivision values after dividing the maximum value according to n weights as the second sub configuration upper limits of the n bandwidths during multi-bandwidth transmission, in which the n weights correspond to the n bandwidths one by one and a sum of the n weights is 1;

or, calculating by the terminal, a minimum value of the first sub configuration upper limits of the equivalent duty cycles of the n bandwidths working independently at the corresponding power class, and determining n subdivision values after dividing the minimum value according to n weights as the second sub configuration upper limits of the n bandwidths during multi-bandwidth transmission, in which the n weights correspond to the n bandwidths one by one and a sum of the n weights is 1.

16. The method of claim 14, wherein, determining by the terminal, the configuration upper limit of the overall equivalent duty cycle according to the second sub configuration upper limit and the specified power class of each bandwidth during multi-bandwidth transmission, comprises:

for each of the n bandwidths, multiplying the second sub configuration upper limit, a specified power class $P_{as\_j}$ and an evaluation time window of the bandwidth during multi-bandwidth transmission to obtain a third product corresponding to the bandwidth; accumulating the third products corresponding to the n bandwidths to obtain the configuration upper limit of the overall equivalent duty cycle;

or, for each of the n bandwidths, multiplying the second sub configuration upper limit and the specified power class $P_{as\_j}$ of the bandwidth during multi-bandwidth transmission to obtain a fourth product corresponding to the bandwidth; accumulating the fourth products corresponding to the n bandwidths to obtain the configuration upper limit of the overall equivalent duty cycle.

17. The method of claim 13, before receiving by the terminal, configuration information sent by the base station, further comprising:

reporting by the terminal, a first sub configuration upper limit of a duty cycle of each of the n bandwidths working independently at the corresponding power class to the base station.

18. A method for power configuration during multi-bandwidth transmission, comprising:

receiving by a terminal, configuration information sent by a base station;

determining power configuration parameters for uplink transmission over a first bandwidth by the terminal according to the configuration information, in which on n bandwidths in a multi-bandwidth transmission scenario, an equivalent duty cycle on the first bandwidth of the terminal configured by the configuration information is not greater than a configuration upper limit corresponding to the first bandwidth.

* * * * *